United States Patent
Esnard et al.

(10) Patent No.: US 9,184,608 B2
(45) Date of Patent: *Nov. 10, 2015

(54) REDUCING CURRENT LEAKAGE AND IMPROVING SHELF LIFE TIME OF BATTERY-BASED-DEVICES

(75) Inventors: Domitille Esnard, Biot (FR); John Walley, Ladera Ranch, CA (US); Louis Pandula, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 13/618,501

(22) Filed: Sep. 14, 2012

(65) Prior Publication Data

US 2013/0009698 A1 Jan. 10, 2013

Related U.S. Application Data

(63) Continuation of application No. 12/611,698, filed on Nov. 3, 2009, now Pat. No. 8,283,899.

(60) Provisional application No. 61/111,190, filed on Nov. 4, 2008.

(51) Int. Cl.
H02J 7/04 (2006.01)
H02H 3/00 (2006.01)
H02J 7/00 (2006.01)
H02J 9/00 (2006.01)

(52) U.S. Cl.
CPC ............. *H02J 7/0031* (2013.01); *H02J 9/005* (2013.01)

(58) Field of Classification Search
CPC ................................ H02J 7/0031
USPC ........ 320/157–159, 162–164; 361/92, 78, 79, 361/86, 88, 90
See application file for complete search history.

(56) References Cited

U.S. PATENT DOCUMENTS

| | | | |
|---|---|---|---|
| 6,114,186 A | 9/2000 | Jeng et al. | |
| 6,144,186 A | 11/2000 | Thandiwe et al. | |
| 7,486,064 B2 * | 2/2009 | Sasaki et al. | 323/299 |
| 7,671,560 B2 * | 3/2010 | Croman et al. | 320/112 |
| 7,768,247 B2 * | 8/2010 | Sasaki et al. | 323/299 |
| 7,772,807 B2 | 8/2010 | Kung et al. | |
| 7,786,696 B2 | 8/2010 | Kim et al. | |
| 8,000,656 B1 | 8/2011 | Jiao et al. | |
| 8,103,266 B2 | 1/2012 | Fok et al. | |

(Continued)

OTHER PUBLICATIONS

"LI-LON Polymer 1Cell Protector", Ricoh, R5426xxxxx Series, No. EA-090-0204, published in 2008 or earlier, 24 pages.

(Continued)

*Primary Examiner* — Richard V Muralidar
(74) *Attorney, Agent, or Firm* — Fiala & Weaver P.L.L.C.

(57) ABSTRACT

An electronic device includes a rechargeable battery, an electrical circuit, a battery safety circuit, and a power down mode circuit. The electrical circuit is configured to generate a power mode control signal. The power down mode circuit receives the power mode control signal. If the power mode control signal has a first value, the power down mode circuit is configured to force a voltage at a first port of the battery safety circuit to a voltage value that is less than an under voltage lock out (UVLO) threshold value of the battery safety circuit to transition the electronic device from a normal operating mode to a low current power down mode. The electronic device may further include a wake up mode circuit.

30 Claims, 15 Drawing Sheets

(56) References Cited

U.S. PATENT DOCUMENTS

| | | |
|---|---|---|
| 8,154,250 B2 | 4/2012 | Yu et al. |
| 8,283,899 B2 * | 10/2012 | Esnard et al. ............ 320/162 |
| 8,571,608 B2 * | 10/2013 | Esnard et al. ............ 455/573 |
| 2003/0030561 A1 | 2/2003 | Yafuso et al. |
| 2005/0014523 A1 | 1/2005 | Pi et al. |
| 2006/0058076 A1 | 3/2006 | Mickle et al. |
| 2006/0217152 A1 | 9/2006 | Fok et al. |
| 2006/0234700 A1 | 10/2006 | Funderburk et al. |
| 2008/0054842 A1 | 3/2008 | Kim et al. |
| 2008/0139195 A1 | 6/2008 | Marsyla et al. |
| 2008/0227427 A1 | 9/2008 | Kadavallur et al. |
| 2009/0058361 A1 | 3/2009 | John |
| 2009/0132186 A1 | 5/2009 | Esnard et al. |
| 2009/0259865 A1 | 10/2009 | Sheynblat et al. |
| 2010/0109765 A1 | 5/2010 | Esnard et al. |
| 2010/0109931 A1 | 5/2010 | Esnard et al. |
| 2010/0181964 A1 | 7/2010 | Huggins et al. |
| 2011/0136550 A1 | 6/2011 | Maugars |
| 2012/0032645 A1 | 2/2012 | Matsuura et al. |
| 2014/0021910 A1 | 1/2014 | Esnard et al. |

OTHER PUBLICATIONS

"Battery Protection IC for 1-Cell Pack", Seiko Instruments Inc., S-8211C Series, Rev.5.4_00, published in 2008 or earlier, 41 pages.

U.S. Appl. No. 12/611,730, entitled "Entering a Battery Power Down Mode Using Over-the-Air Command for Wireless Devices", filed Nov. 3, 2009, 50 pages.

* cited by examiner

1100

1102 receive an electronic device that includes a rechargeable battery and a battery safety circuit

1104 force a voltage at a port of the battery safety circuit coupled to a battery voltage signal to a voltage value that is less than a UVLO threshold value of the battery safety circuit to transition the electronic device from a normal mode to a low current power-down mode

FIG. 11

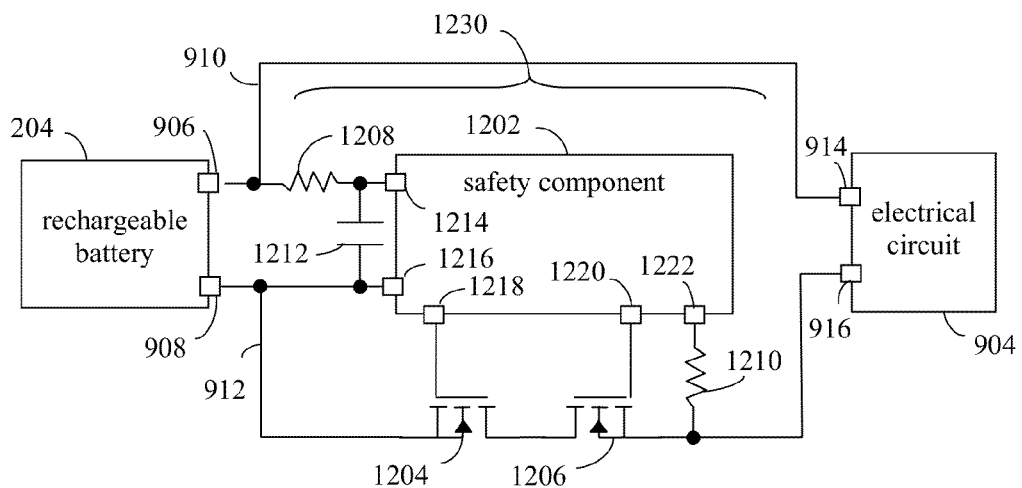

FIG. 12

1402
force the voltage at the port to a voltage value that is greater than the UVLO threshold value of the battery safety circuit to transition the electronic device from the low current power down mode to the normal operating mode

1802 bypass at least the first transistor in the reference voltage signal to transition the electronic device from the low current power down mode to the normal operating mode

FIG. 18

1902 temporarily close a switch to bypass the first transistor in the reference voltage signal to transition the electronic device from the low current power down mode to the normal operating mode

FIG. 19

REDUCING CURRENT LEAKAGE AND IMPROVING SHELF LIFE TIME OF BATTERY-BASED-DEVICES

This application is a continuation of U.S. patent application Ser. No. 12/611,698, filed Nov. 3, 2009, issued as U.S. Pat. No. 8,283,899, which claims the benefit of U.S. Provisional Application No. 61/111,190, filed on Nov. 4, 2008, both of which are incorporated by reference herein in their entireties.

BACKGROUND OF THE INVENTION

1. Field of the Invention

The present invention relates to reducing power consumption in electronic devices that use batteries.

2. Background Art

A battery is a device that provides electrical energy used to power an electrical device. A battery typically includes one or more electrochemical cells that store chemical energy, which is converted to electrical energy output by the battery to provide power. Batteries are used in a multitude of electrical devices, such as electrical devices that are mobile, small, and/or unable to be constantly connected to another power source such as an AC (alternating current) power source. Batteries may also be used in electrical devices as a backup power source, to provide power when a primary power source is lost.

A rechargeable battery is a type of battery that is becoming increasingly popular. Charge in a rechargeable battery can be restored by the application of electrical energy. Rechargeable batteries based on lithium, such as lithium ion and lithium polymer batteries, are becoming increasingly widespread. A typical charging cycle for a lithium rechargeable battery includes a first charge phase, where a constant current is used to charge the battery (while battery voltage increases), and a second charge phase, where a constant voltage is applied to the battery to finish charging the battery (while the charge current decreases).

A typical lithium battery is typically shipped pre-charged to approximately 50% of its total available charge capacity to enable the battery to function properly upon receipt by a user. However, lithium batteries suffer from self-discharge when not in use. Such self-discharge may occur when a lithium battery is sitting unused on a shelf (e.g., prior to sale of the battery), such that it gradually loses energy due to undesired internal chemical actions. Thus, a lithium battery will slowly discharge prior to sale, which can be for a long time (e.g., 1-2 years). If a lithium battery discharges an amount such that a voltage of the lithium battery drops below a certain voltage value, irreversible long term damage (charge capacity loss) to the lithium battery may occur, as well as safety risks increasing.

One way to increase the shelf-lifetime of a lithium battery is to charge the lithium battery to a higher value (e.g., to 90% of its capacity) so that it takes longer to discharge. However, this is not an ideal solution because the increased amount of charging increases manufacturing costs and is not ideal for battery health. Typically, the maximum amount of charge that a lithium battery can maintain decreases with age. The higher the amount of charge stored in a lithium battery, the more rapidly that this decrease in maximum charge capacity occurs. As such, this aging effect and rate of cell self-discharge for a lithium battery increases as the amount of charge stored in the lithium battery is increased. As such, electronic devices with small lithium batteries (e.g., 50 mAH) are not able to achieve desirable store shelf-life according to conventional techniques, such as by increasing the amount of stored charge.

As such, it may be desired for lithium batteries in manufactured electronic devices to be placed in a mode that reduces battery self discharge without reducing the useful lifespan of the battery. However before the manufacturing process is complete, electronic devices typically are tested in a final form (e.g., according to an electrical verification process). Thus, the battery typically must be functional to power the electronic device during testing, and will need to be transitioned to the power down mode after such testing is complete. An external debug interface (e.g., a wired interface to a UART (universal asynchronous receiver/transmitter)) and/or a button press combination (by a human operator) may be used to test an electronic device and to enable the battery to be caused to enter the power down mode after testing, for example. However, the presence of such physical interfaces and the need for manual interaction for device testing and shut down are undesirable.

BRIEF SUMMARY OF THE INVENTION

Methods, systems, and apparatuses are described for reducing current leakage and improving shelf life time of battery-based-devices substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 11 shows a flowchart providing a process for transitioning an electronic device to a low power mode, according to an example embodiment.

FIG. 12 shows a circuit diagram of an electrical device that includes a safety circuit, according to an example embodiment.

FIGS. 18 and 19 show processes for transitioning an electronic device from a low current power down mode to a normal operating mode, according to example embodiments.

Figure 1:
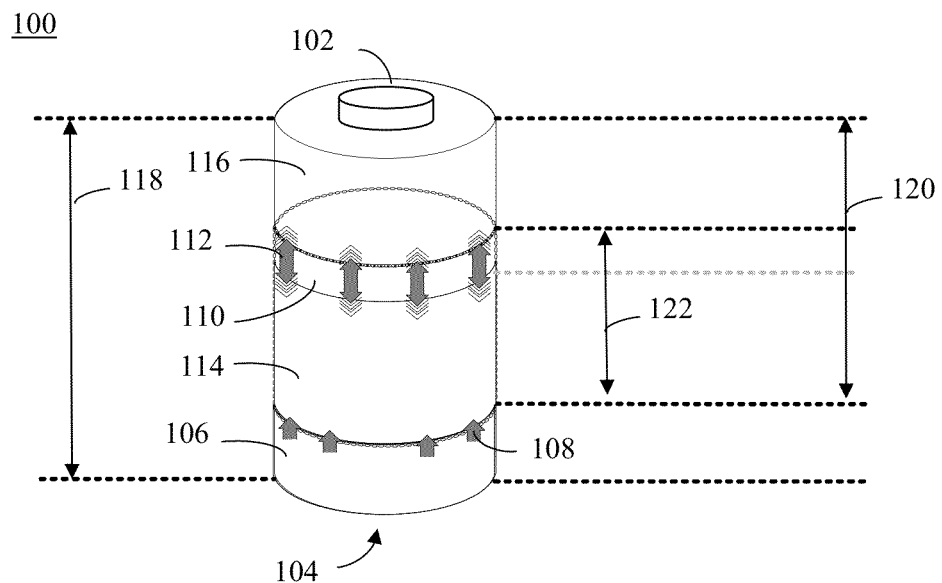
FIG. 1 shows a graphical representation of example charge characteristics of a battery.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Embodiments are described herein for wireless test, calibration, and shut down of battery-based devices, and for reducing current leakage and improving shelf life time of battery-based devices. The following section describes example battery characteristics, followed by sections describing example embodiments for wireless test and shutdown of devices, and for transitioning devices to low-power consumption modes.

II. Example Battery Characteristics

Embodiments of the present invention relate to batteries. A battery is a device that provides electrical energy used to power an electrical device. A battery typically includes one or more electrochemical cells that store chemical energy, which is converted to electrical energy that is output by the device to provide power. FIG. 1 shows a view representing charge characteristics of a battery 100, which are described in detail below. Battery 100 has a first terminal 102 (e.g., negative or positive polarity) and a second terminal 104 (with polarity opposite that of first terminal 102). Battery 100 may be a rechargeable battery formed of a material that enables recharging. For example, battery 100 may be a lithium-based rechargeable battery, such as a lithium ion (Li-ion) or lithium ion polymer (Li-ion polymer) battery. Charge in a rechargeable battery such as battery 100 can be restored by the application of electrical energy. Typically, the maximum amount of charge that a rechargeable battery can maintain decreases with age.

The behavior of a lithium battery is complex, involving chemical reactions, reaction kinetics, and diffusion processes. Thus, a circuit equivalent model of a lithium battery is complex, as it typically includes non-linear components. In FIG. 1, the illustrated total volume of battery 100 represents the initial (e.g., when the battery is manufactured) total charge capacity of battery 100 (also indicated by initial total charge 118 in FIG. 1). A charged portion 114 of battery 100 is shown in FIG. 1 that contains available charge. An uncharged portion 116 of battery 100 is shown in FIG. 1. Uncharged portion 116 is a charge-free or uncharged portion of battery 100, which may be uncharged because battery 100 was not fully charged on a previous charge cycle, because charge has recently been supplied by battery 100, and/or for other reason. As battery 100 ages, cell(s) of battery 100 will oxidize. An oxidized portion 106 shown at the bottom of battery 100 in FIG. 1 represents a portion of the total charge volume of battery 100 that is lost due to aging related oxidation. As indicated by arrows 108, a size of oxidized portion 106 increases during the life of battery 100. Thus, oxidized portion 106 represents a decrease over time in the amount of charge that battery 100 may store due to aging-related oxidation.

A charge process equilibrium portion 110 of battery 100 is also shown in FIG. 1. Charge process equilibrium portion 110 represents an unknown state of battery 100 due mainly to the discharge rate of battery 100. As indicated by arrows 112 in FIG. 1, the charge volume of portion 110 may fluctuate. The charge volume of portion 110 depends on various parameters, such as the aging of battery 100, a state of charge of battery 100, a history of battery 100, a temperature of battery 100, etc. In portion 110, electrons are in transition after a charging or discharging event, but typically come to equilibrium after time (e.g., after 1 hour).

A state of health (SOH) 120 of battery 100 is indicated in FIG. 1. SOH 120 represents a total charge capacity of battery 100—an amount of charge that may actually be available in battery 100, taking into account aging of battery 100. A state of charge (SOC) 122 of battery 100 represents an amount of charge currently in battery 100 that can be used. SOC 122 is typically defined as a percentage.

SOH 120 of battery 100 may be calculated according to $$SOH = ICC \times (100\% - DCCP) \qquad \text{Equation 1}$$

where
ICC=initial charge capacity of battery 100, and
DCCP=decreased charge capacity of battery 100.

The decreased charge capacity of battery 100 may be due to oxidized portion 106. For instance, if battery 100 has an initial charge capacity of 130 mAH (milli-Ampere-hour) (initial total charge 118) that has decreased by 20%, SOH 120 of battery 100 may be calculated as SOH=130 mAH (100%−20%)=104 mAH.

In this example, when fully charged, battery 100 is able to provide 104 mAH of charge, which is a reduction from the initial charge capacity of battery 100 of 130 mAH.

Figure 2:
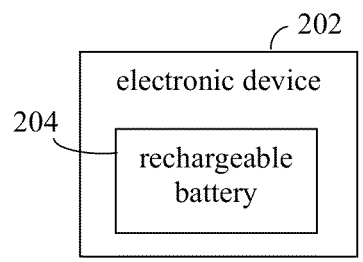
FIG. 2 shows a block diagram of an electronic device that includes a rechargeable battery, according to an example embodiment.

Lithium batteries suffer from self-discharge when not in use, such that their SOC declines. Such self-discharge may occur when a lithium battery is sitting unused on a shelf in an electronic device. For instance, FIG. 2 shows a block diagram of an electronic device 202 that includes a rechargeable battery 204. Rechargeable battery 204 may be a lithium battery, or other type of rechargeable battery. Electronic device 202 may be any type of electronic device, including a wireless electronic device such as a wireless headset, a mobile device (e.g., a mobile computer, smart phone, etc.), a music player (e.g., an MP3 player, an Apple iPod, etc.), a wireless mouse, etc. When electronic device 202 is shut down, although the rechargeable battery 204 is inactive, rechargeable battery 204 leaks current because of the power demands of the electronic components of electronic device 202. If a lithium battery discharges an amount such that a voltage of the lithium battery drops below a certain voltage value, irreversible long term damage (decline in SOH value) to the lithium battery may occur. To extend the shelf life of rechargeable battery 204, it is desirable to prevent such current leakage, particularly when electronic device 202 is shut down for long periods, such as when it is stored before being sold.

Charging a lithium battery to a higher value so that it takes longer to discharge while sitting on a shelf is undesirable because the increased amount of charging increases manufacturing costs and is not ideal for battery health. The higher the amount of charge stored in a lithium battery, the more rapidly that the decrease in SOH occurs. As such, it may be desired for lithium batteries in manufactured electronic devices, such as electronic device 202, to be placed in a mode that reduces battery self discharge without reducing the useful lifespan of the battery. However before the manufacturing process is complete, electronic devices typically are tested (with battery power available) prior to being shutdown. This typically requires the electronic device to have an external debug interface for testing and/or one or more human-usable buttons for shutdown. Embodiments are described in the following sections for wireless test and shutdown of devices, and for improved techniques for transitioning devices to low-power consumption modes.

III. Example Embodiments for Wireless Device Test and Shutdown Using Over-the-Air Commands Embodiments are described in this section for using wireless commands to enable test, calibration, and/or shutdown of electronic devices that have been manufactured. For example, such wireless commands may be applied to electronic devices before such devices leave the manufacturing process and/or facility. Such embodiments enable less complexity in the processing of manufactured electronic devices, and longer shelf life for battery-powered electronic devices.

Figure 3:
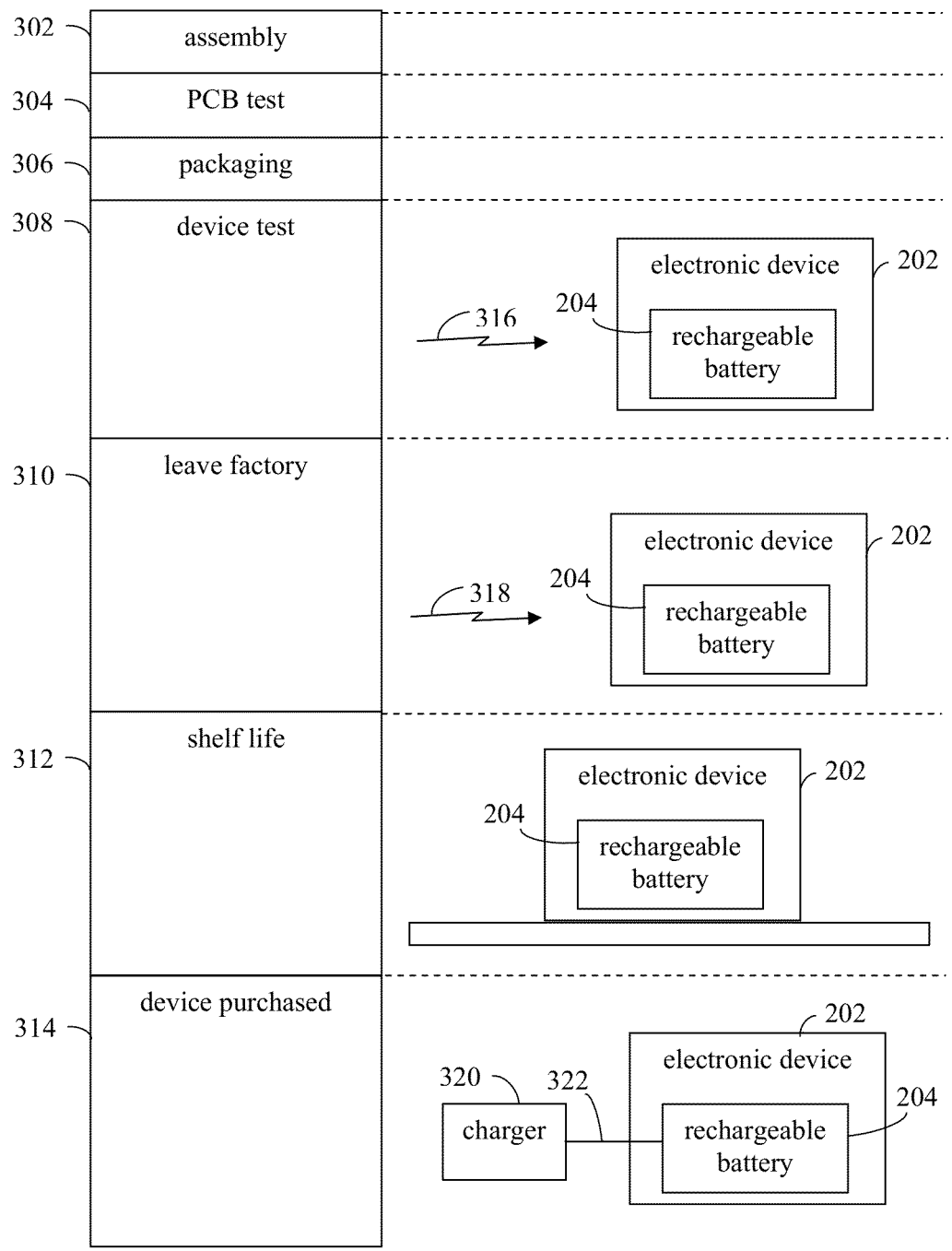
FIG. 3 shows a block diagram of a lifecycle for a battery-powered electronic device, according to an example embodiment.

FIG. 3 shows a block diagram of a lifecycle 300 for electronic device 202, according to an example embodiment. Lifecycle 300 is shown to illustrate various power stages that electronic device 202 may pass through during its lifetime, including during manufacturing and test, and eventual sale of electronic device 202. As shown in FIG. 3, various events and/or processes occur during lifecycle 300, including assembly 302, PCB (printed circuit board) test 304, packaging 306, device test 308, leave factory 310, shelf life 312, and device purchased 314. In FIG. 3, earlier events and/or processes in lifecycle 300 generally have lower reference numerals, although some events/processes of lifecycle 300 may occur in orders that are different than shown in FIG. 3. Lifecycle 300 is described as follows.

Assembly 302, PCB test 304, packaging 306, device test 308, and leave factory 310 are events/processes that typically occur in a manufacturing/assembly facility (e.g., a factory) for electronic device 300. During assembly 302, components of electronic device 202 may be assembled together, such as on one or more circuit boards. During PCB test 304, board level tests may be performed on the assembled components. During packaging 306, electronic device 202 may be assembled into final form. Note that rechargeable battery 204 may be charged prior to or during any of assembly 302, PCB test 304, and packaging 306.

During device test 308, electronic device 202 may be calibrated and/or tested in its final form. Conventionally, an electronic device under test, even a wireless electronic device, has a wired debug interface (e.g., a connector) for attaching a cable used to provide test signals/commands to the electronic device. An example of such an interface is a UART (universal asynchronous receiver/transmitter) or a USB (universal serial bus) wired interface. In some cases, for electronic devices that have a wired and/or wireless interface, but are not configured to use them for this purpose, the electronic device case is manually opened to make a connection to provide commands to the electronic device. As shown in FIG. 3, instead of a wired interface, one or more wireless test signals 316 may be transmitted to electronic device 202 to calibrate and/or test electronic device 202. For instance, in an embodiment, electronic device 202 may be a wireless device, such as a headset or mobile device, that has built in wireless communication capability, and this built in wireless communication capability may be leveraged to calibrate and/or test electronic device 202 wirelessly. In this manner, electronic device 202 does not need to include a wired interface (e.g., an external connector, etc.) that may otherwise be present as a debug interface, reducing a cost and simplifying manufacturability of electronic device 202.

At leave factory 310 in FIG. 3, electronic device 202 may depart the assembly facility. When electronic device 202 is ready to depart the assembly facility, it may be desired to place electronic device 202 in a low power mode, to preserve charge stored in rechargeable battery 204. In this manner, when electronic device 202 is purchased, rechargeable battery 204 may have retained sufficient charge to be useable "off the shelf" and/or the charge level of rechargeable battery 204 may not have declined so much that rechargeable battery 204 is damaged (e.g., when a lithium battery). Conventionally, a wired interface (e.g., the debug interface described above) is used to provide a command to an electronic device to place the electronic device into a low power mode. As shown in FIG. 3, in an embodiment, a wireless shutdown command 318 may be transmitted to electronic device 202 to cause electronic device 202 to transition to a low power mode. In this manner, electronic device 202 does not need to include a wired interface (e.g., an external connector, etc.) for shutdown, reducing a cost and simplifying the manufacturability of electronic device 202.

At shelf life 312, after leaving the factory, electronic device 202 may be delivered to a retail store, warehouse, or other location where electronic device 202 may be stored (e.g., on a shelf) for a period of time. This time period may have any length, including being as long as one or more years. As such, rechargeable battery 204 will self-discharge over time as described above, such that the state of charge of rechargeable battery 204 will decrease. By placing electronic device 202 in the low power mode, rechargeable battery 204 will not self-discharge as rapidly as if electronic device 202 remains in a normal operating mode. As such, this enables electronic device 202 to be stored for long periods of times, even as long as one or more years, without self-discharging to the point where rechargeable battery 204 is damaged.

At device purchased 314, electronic device 202 may be obtained (e.g., purchased) by a user. The user may desire to use electronic device 202, and thus electronic device 202 may need to be charged, and will need to be transitioned from the low power mode to the normal operating mode. As shown in FIG. 3, in an embodiment, by coupling a charger 320 to electronic device 202 to charge rechargeable battery 204, electronic device 202 may be caused to transition from the low power mode to the normal operating mode. For instance, electronic device 202 may be configured such that a charge voltage 322 provided by charger 320 to rechargeable battery 204 (e.g., at a battery charge interface of electronic device 202) causes electronic device 202 to transition from the low power mode to the normal operating mode. Thus, the user need not perform any specific operations to transition electronic device 202 from the low power mode to the normal operating mode, as this occurs by coupling charger 320 to electronic device 202.

Figure 4:
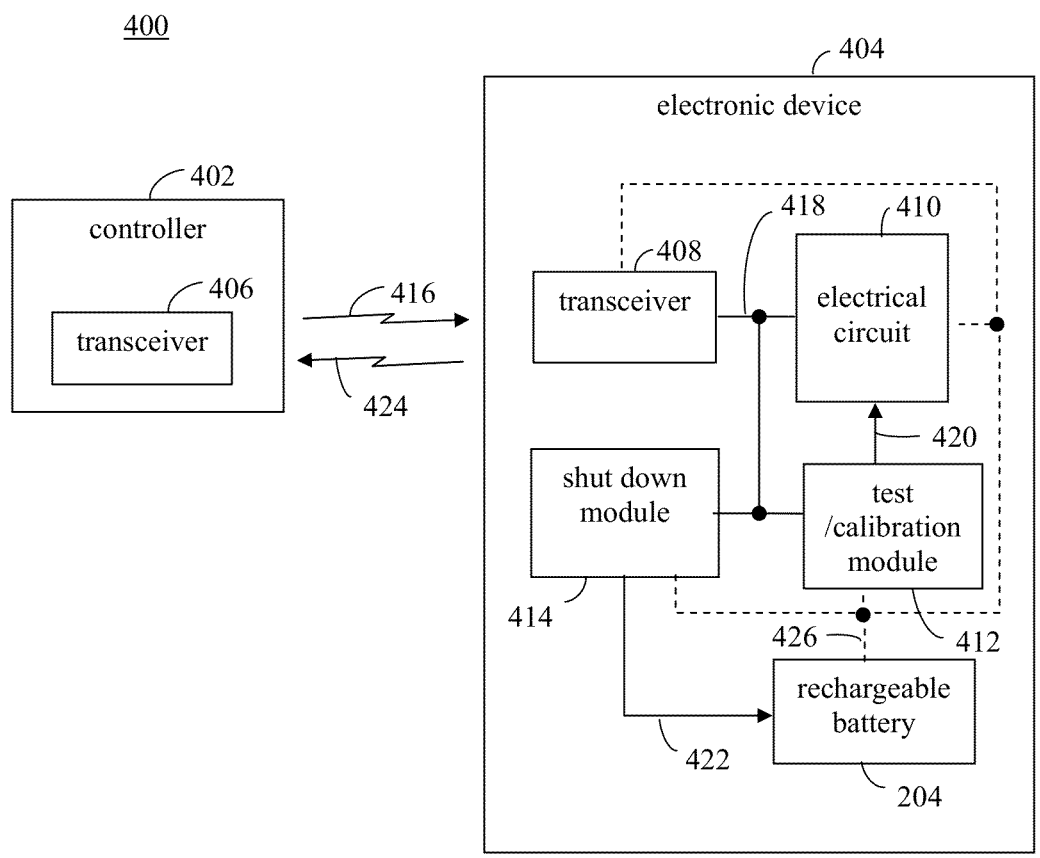
FIGS. 4 and 5 show block diagrams of systems for testing, calibrating, and shutting down an electronic device, according to an example embodiment.

Electronic device 202 may be configured in various ways to operate in this manner. For example, FIG. 4 shows a block diagram of a system 400 for testing, calibrating, and shutting down an electronic device, according to an example embodiment. As shown in FIG. 4, system 400 includes a controller 402 and an electronic device 404. Electronic device 404 is an example of electronic device 202. In an embodiment, system 400 may be implemented in an assembly facility for electronic device 404 (e.g., for use at device test 308 and/or leave factory 310 of FIG. 3). Controller 402 includes a transceiver 406. Electronic device 404 includes a transceiver 408, an electrical circuit 410, a test/calibration module 412, a shut down module 414, and rechargeable battery 204. System 400 is further described as follows.

Controller 402 may be one or more devices used to wirelessly test, calibrate, and/or shut down electronic device 404 (e.g., prior to electronic device 404 leaving an assembly facility). Controller 402 may include one or more special purpose test and/or calibration devices, and/or one or more computers. Transceiver 406 of controller 402 may be a transmitter and may optionally include a receiver. As shown in FIG. 4, transceiver 406 may transmit one or more wireless commands 416 received by transceiver 408 of electronic device 404. Wireless command 416 may include a test command, calibration command, and/or a shut down command, for example. In an embodiment, electronic device 404 may perform one or more functions according to wireless command 416, and transceiver 408 of electronic device 404 may optionally transmit a response signal 424. For example, response signal 424 may include test result data, calibration result data, and/or an acknowledgement of a test command, calibration command, and/or a shut down command received in wireless command 416.

Figure 5:
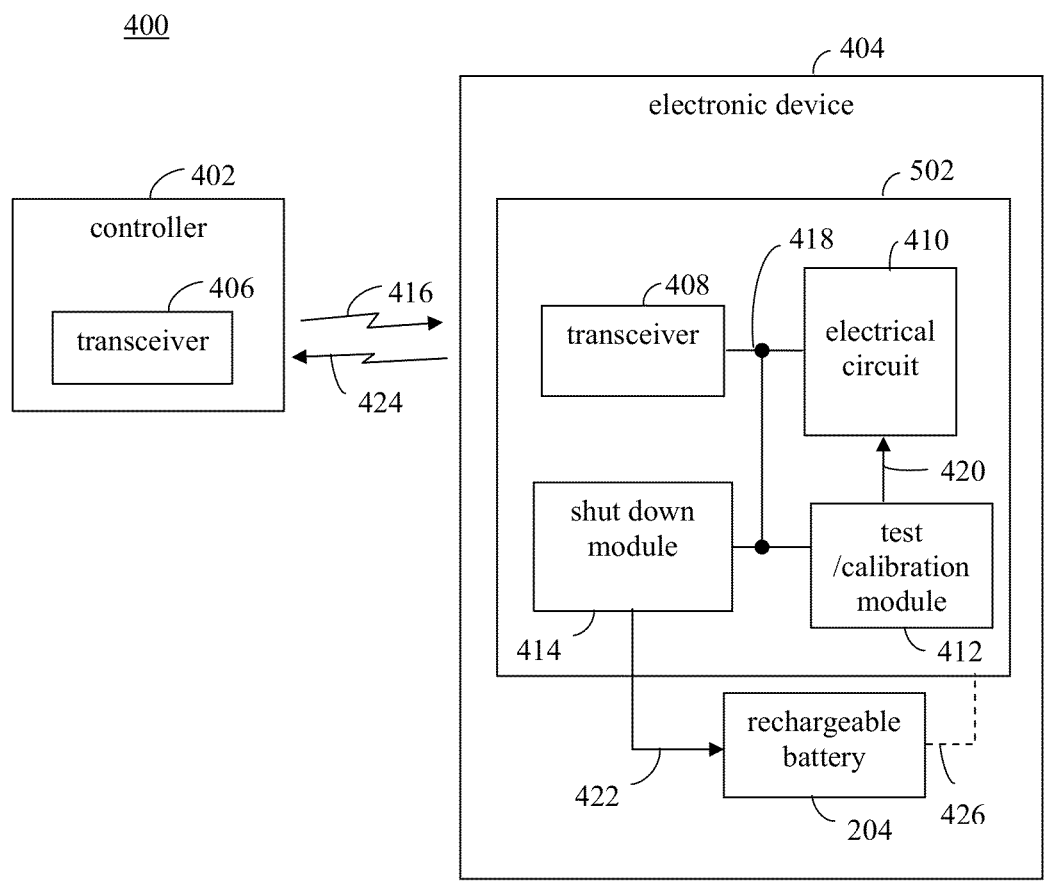

Transceiver 408 of electronic device 404 may be a receiver and may optionally include a transmitter. Transceiver 408 is configured to enable wireless communications for electronic device 404, which may be a wireless device. For example, transceiver 408 may be capable of receiving wireless commands configured to cause corresponding functions to be performed in electronic device 404. In the embodiment of FIG. 5, electronic device 404 does not include a wired communication interface (e.g., a communication module that uses a physical connector to connect an external cable or wire to electronic device 404 to carry communication signals), although in other embodiments, electronic device 404 may include a wired communication interface. Transceiver 408 may be configured to communicate according to one or more wireless standards and/or protocols, including an IEEE 802.11 wireless LAN (WLAN) standard, a Worldwide Interoperability for Microwave Access (Wi-MAX) standard, a Bluetooth™ protocol, a mobile telecommunications standard (e.g., 2G, 3G, etc.), etc.

Electrical circuit 410 may include one or more electrical components, including processors (e.g., microprocessors), microphones, speakers, displays, etc., that provide functionality of electrical device 404. Test/calibration module 412 may be configured to perform a calibration function in electronic device 404 according to a calibration command received by transceiver 408, and/or a test function in electronic device 404 according to a test command received by transceiver 408. For example, as shown in FIG. 4, test/calibration module 412 may provide a test/calibration signal 420 (e.g., based on wireless command 416) to electrical circuit 410 to test and/or calibrate one or more components of electrical circuit 410. In an embodiment, test/calibration module 412 may include a separate test module and/or calibration module that respectively enable the test and/or calibration functions. Shut down module 414 is configured to cause electronic device 404 to initiate a shut down protocol according to a shut down command received by transceiver 408. For example, shut down module 414 may be configured to generate a shut down command 422 (e.g., based on wireless command 416) received at rechargeable battery 204 that is configured to cause electronic device 414 to enter a low power consumption mode.

Transceiver 408, electrical circuit 410, test/calibration module 412, and shut down module 414 are coupled together and may communicate with each other via electrical connections 418. Rechargeable battery 204 may be at least partially charged. Rechargeable battery 204 provides one or more voltages 426 used to power transceiver 408, electrical circuit 410, test/calibration module 412, and shut down module 414. In embodiments, transceiver 408, electrical circuit 410, test/calibration module 412, and shut down module 414 may be each implemented as one or more electrical components (e.g., integrated circuits, discrete components, etc.). In another embodiment, as shown in FIG. 5, transceiver 408, electrical circuit 410, test/calibration module 412, and shut down module 414 may be included in an common integrated circuit device (e.g., an integrated circuit chip and/or package) 502.

Figure 6:
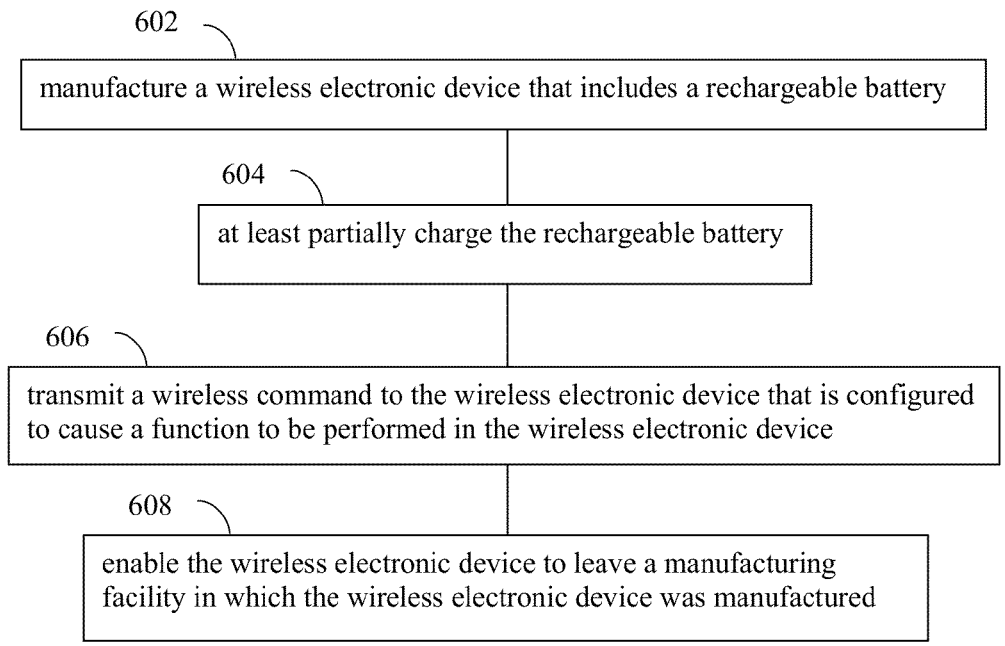
FIG. 6 shows a flowchart providing a process in an assembly facility for an electronic device, according to an example embodiment of the present invention.
Figure 7:
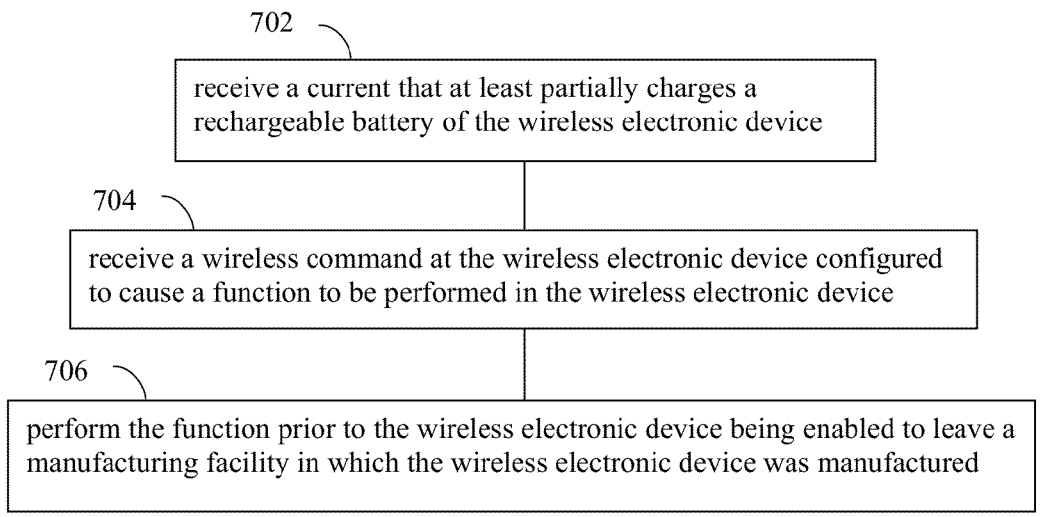
FIG. 7 shows a flowchart providing a process that may be performed by an electronic device, according to an example embodiment.

System 400 may operate in various ways to test, calibrate, and/or shut down electronic device 404. For example, FIG. 6 shows a flowchart 600 providing a process that may be implemented in an assembly facility for electronic device 404, according to an example embodiment of the present invention. FIG. 7 shows a flowchart 700 providing a process that may be performed by electronic device 404, according to an example embodiment. Other structural and operational embodiments will be apparent to persons skilled in the relevant art(s) based on the discussion regarding flowcharts 600 and 700. Flowcharts 600 and 700 are described as follows.

Flowchart 600 begins with step 602. In step 602, a wireless electronic device is manufactured that includes a rechargeable battery. For example, electronic device 202 of FIG. 2 may be manufactured. As shown in FIG. 2, electronic device 202 includes rechargeable battery 204. In the example of FIG. 3, electronic device 202 may be manufactured in an assembly facility as indicated by assembly 302 and packaging 306 in lifecycle 300.

In step 604, the rechargeable battery is at least partially charged. As described above, rechargeable battery 204 may be at least partially charged at some time prior to device test 308 of FIG. 3. For instance, rechargeable battery 204 may be charged to 50% of full charge capacity (i.e., charged to have a state of charge of 50% of the state of health of battery 100 of FIG. 1) or to other percentage of full charge capacity.

In step 606, a wireless command is transmitted to the wireless electronic device that is configured to cause a function to be performed in the wireless electronic device. For example, as shown in FIG. 3, wireless test signal 316 and/or wireless shutdown command 318 may be transmitted to electronic device 202. As shown in FIG. 4, wireless command 416 may be transmitted from controller 402 to electronic device 404. Wireless command 416 may be configured to cause a function to be performed in electronic device 404. Examples of wireless commands 416 include a test command configured to perform a test of the functionality of electrical circuit 410 or other portion of electronic device 404, a calibration command configured to perform a calibration function on one or more components of electrical circuit 410 or other portion of electronic device 404 (e.g., calibrate a microphone, a display device, etc.), and a shut down command configured to perform a shut down function in electrical device 404.

In step 608, the wireless electronic device is enabled to leave a manufacturing facility in which the wireless electronic device was manufactured. For example, referring to FIG. 2, in an embodiment, after performing desired test, calibration, and/or shut down functions for electronic device 202, electronic device 202 is enabled to leave the assembly facility (e.g., by transportation vehicle, etc.).

Flowchart 700 provides a process in an electronic device that is analogous to flowchart 600. Flowchart 700 begins with step 702. In step 702, a current is received that at least partially charges a rechargeable battery of the wireless electronic device. For example, rechargeable battery 204 may receive a charge current from a battery charger that at least partially charges rechargeable battery 204 at some time prior to device test 308 of FIG. 3. For instance, rechargeable battery 204 may be charged to 50% of full charge capacity (i.e., charged to have a state of charge of 50% of the state of health of battery 100 of FIG. 1) or to other percentage of full charge capacity.

In step 704, a wireless command is received at the wireless electronic device configured to cause a function to be performed in the wireless electronic device. For example, as shown in FIG. 3, wireless test signal 316 and/or wireless shutdown command 318 may be transmitted to electronic device 202. As shown in FIG. 4, wireless command 416 may be received by transceiver 408 of electronic device 404 from controller 402. Wireless command 416 may be configured to cause a function to be performed in electronic device 404. Examples of wireless commands 416 include a test command configured to perform a test of the functionality of electrical circuit 410 or other portion of electronic device 404, a calibration command configured to perform a calibration function on one or more components of electrical circuit 410 or other portion of electronic device 404 (e.g., calibrate a microphone, a display device, etc.), and a shut down command configured to perform a shut down function in electrical device 404.

In step 706, the function is performed prior to the wireless electronic device being enabled to leave a manufacturing facility in which the wireless electronic device was manufactured. For example, if wireless command 416 is a test command, test/calibration module 412 (or a test module) may perform a test function according to the test command. If wireless command 416 is a calibration command, test/calibration module 412 (or a calibration module) may perform a calibration function according to the calibration command. If wireless command 416 is a shut down command, shut down module 414 may perform a shut down function according to the shut down command. Optionally, test/calibration module 412 and/or shut down module 414 may generate a response (e.g., test results, calibration results, an acknowledgement, etc.) that is transmitted by transceiver 408 to controller 402 (e.g., in response signal 424). After the desired test, calibration, and/or shut down functions are performed for electronic device 404, electronic device 404 may be enabled to leave the manufacturing facility for potential sale/delivery to a customer.

Any types of test and/or calibration functions may be performed in electronic device 404, as enabled by wireless command 416. For instance, in an embodiment, a test command received at electronic device 404 may cause a test module to initiate an antenna test (e.g., for an antenna of electronic device 404) that generates one or more antenna-related parameters. The parameters may be used to change antenna operation (e.g., field strength parameters) for an antenna of electronic device 404, and may be stored in electronic device 404 (e.g., in a memory device, such as an EEPROM). In another embodiment, a test command received at electronic device 404 may cause a test module to initiate an acoustical test, such as testing an acoustic gain (e.g., for a speaker of electronic device 404) that results in a gain value being generated. The gain value may be used to change a gain in electronic device 404, and may be stored in electronic device 404 (e.g., in a memory device, such as an EEPROM).

The test, calibration, and shut down functions may be implemented in various ways, depending on the particular test, calibration, and/or shut down function. For instance, flowchart 800 shows a process for performing a shut down function for an electronic device, according to an example embodiment. Various structural and operational embodiments will be apparent to persons skilled in the relevant art(s) based on the discussion regarding flowchart 800. Flowchart 800 is described as follows.

Flowchart 800 begins with step 802. In step 802, a shut down command is received that is configured to cause the wireless electronic device to initiate a shut down protocol. Step 802 is an example of step 704 of FIG. 7. As shown in FIG. 3, wireless shutdown command 318 may be received by electronic device 202. As shown in FIG. 4, wireless command 416 may be received by transceiver 408 of electronic device 404 from controller 402. Wireless command 416 may include a shut down command configured to perform a shut down function or protocol in electrical device 404.

In step 804, the shut down protocol is performed to cause the wireless electronic device to enter a low power mode. Step 804 is an example of step 706 of FIG. 7. For example, shut down module 414 may perform a shut down function according to shutdown command 318 (FIG. 3) or the shut down command received in wireless command 416 (FIG. 4) (e.g., during leave factory 310 of FIG. 3). The shut down protocol may cause electronic device 404 to transition from a normal operating mode, or other mode, to a low power mode. In this manner, electronic device 404 reduces an amount of self-discharge of rechargeable battery 204 (e.g., during shelf life 312). Examples of transitioning electronic devices to lower power modes are described in further detail further below.

In step 806, a charge voltage is received at the rechargeable battery from a battery charger after leaving the manufacturing facility. For example, as shown in FIG. 3, charger 320 may provide a charge voltage to charge rechargeable battery 204 of electronic device 202 (or electronic device 404 of FIG. 4) after electronic device 202 has been shutdown according to step 804. Charger 320 may be applied to rechargeable battery 204 by a user having received (e.g., purchased) electronic device 202 (at device purchased 314 of FIG. 3).

In step 808, the wireless electronic device transitions from the low power mode to a normal operation mode in response to receiving the charge voltage. For example, in an embodiment, electronic device 202 (or electronic device 404) may be configured to transition from the low power mode to the normal operating mode (or other mode) in response to receiving charge voltage 322 from charger 320.

Thus, as described above, electronic devices may be tested, calibrated, and transitioned to low power modes in a wireless manner. This enables electronic devices to be manufactured that do not require wired interfaces for testing, calibration, and/or transition to low power modes. There is no need to have a special purpose button, key press combination, or debug interface dedicated to enabling these functions. For instance, built-in receivers of the electronic devices (e.g., Bluetooth receiver in a Bluetooth headset, IEEE 802.11 WLAN interface in a mobile computer, wireless USB, etc.) may be used to receive the wireless command signals for the testing, calibration, and transitioning to low power. In this manner, such functions may be performed more rapidly (e.g., parallelized) and more easily compared to a combination of key presses and/or plugging into a debug interface (e.g. USB, UART, etc.) of the electronic device. Note that although embodiments are described herein as being implemented in an electronic device that contains a rechargeable battery, embodiments may also be implemented in a standalone rechargeable battery to increase the shelf life of the rechargeable battery.

The following section describes further example embodiments for transitioning electronic devices to low power modes.

IV. Example Embodiments for Reducing Electronic Device Leakage During Store-Shelf Life Embodiments are described for reducing battery self-discharge during electronic device non-use (e.g., when stored on a shelf prior to sale, etc.). In embodiments, a device is caused to enter a low power mode based on an external event/decision, regardless of an actual voltage or amount of charge stored by the battery. Furthermore, the low power mode may be caused to be exited based on a subsequent external event/decision.

Figure 9:
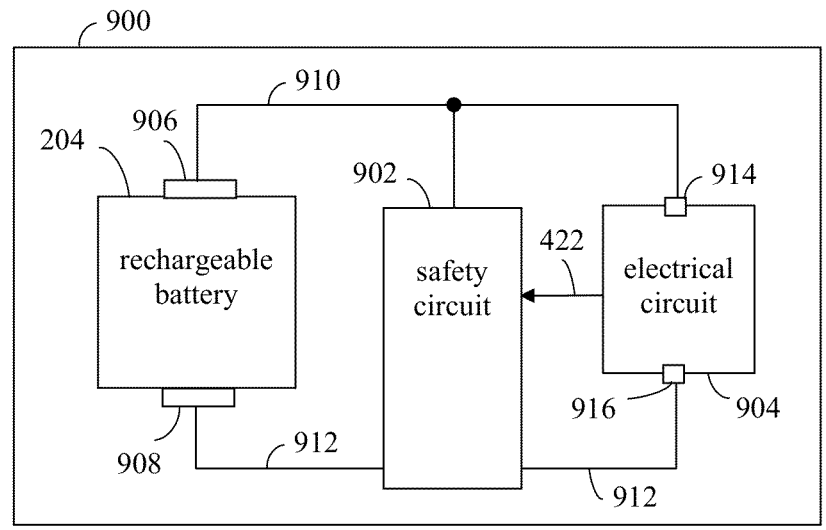
FIG. 9 shows a block diagram of an electronic device, according to an example embodiment.

Electronic devices, such as electronic device 202 described above, may be equipped with safety circuits that are present to protect the electronic devices during charging and discharging. For example, a safety circuit may protect against an overcharge current, an overdischarge current, an overcharge voltage, and an overdischarge voltage, which may otherwise damage rechargeable batteries installed in an electronic device. For instance, FIG. 9 shows a block diagram of an electronic device 900, according to an example embodiment. Electronic device 900 is an example of electronic device 202 described above, and may optionally include the features of electronic device 404 of FIG. 4, in an embodiment. As shown in FIG. 9, electronic device 900 includes rechargeable battery 204, a safety circuit 902, and an electrical circuit 904. Electronic device 900 is described as follows.

As shown in FIG. 9, rechargeable battery 204 has a first terminal 906 and a second terminal 908. First terminal 906 is coupled to a battery voltage signal 910 and second terminal 908 is coupled to a reference voltage signal 912. For example, first terminal 906 may be a positive polarity terminal and second terminal 908 may be a negative polarity terminal of rechargeable battery 204. Current may flow from rechargeable battery 204 from first terminal 906 through battery voltage signal 910, and may return to rechargeable battery 204 through reference voltage signal 912 to second terminal 908.

Electrical circuit 904 is powered by rechargeable battery 204. A first port 914 of electrical circuit 904 is coupled to battery voltage signal 910, and a second port 916 of electrical circuit 904 is coupled to reference voltage signal 912. Electrical circuit 904 may include one or more electrical components, including processors (e.g., microprocessors), microphones, speakers, displays, etc., that provide functionality of electrical device 900. For example, electrical device 904 may include transceiver 408, electrical circuit 410, test/calibration module 412, and/or shut down module 414 shown in FIG. 4, which may be implemented separately or together in a common device, such integrated circuit device 502 of FIG. 5. Ports 914 and 916 may be pins, other connectors, or circuit nodes of electrical circuit 904. As shown in FIG. 9, electrical circuit 904 generates shut down command 422 (which is shown in FIG. 4 as generated by shut down module 414). Shut down command 422 may be a power mode control signal configured to cause rechargeable battery 204 to transition to a low power mode.

Safety circuit 902 is coupled to battery voltage signal 910 and reference voltage signal 912. Safety circuit 902 is configured to protect rechargeable battery 204 against an overcharge current, an overdischarge current, an overcharge voltage, and an overdischarge voltage being provided during a charge cycle, which may otherwise damage rechargeable battery 204. For example, as shown in FIG. 9, reference voltage signal 912 may be coupled through safety circuit 902, such that safety circuit 902 may selectively create an open circuit in reference voltage signal 912, to protect rechargeable battery 204 during an overcharge or overdischarge event. Note that in an embodiment, rather than reference voltage signal 912 being coupled through safety circuit 902, battery voltage signal 910 may be coupled through safety circuit 902, such that safety circuit 902 may selectively create an open circuit in battery voltage signal 910, to protect rechargeable battery 204 during an overcharge or overdischarge event.

Figure 10:
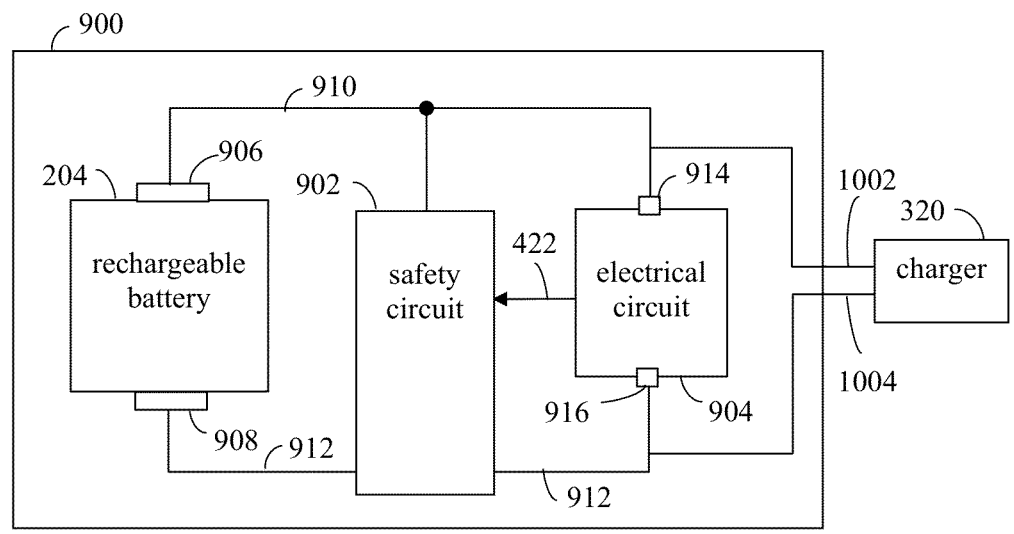
FIG. 10 shows a block diagram of the electronic device of FIG. 9 with a battery charger coupled thereto to charge a rechargeable battery of the electronic device.

FIG. 10 shows a block diagram of electronic device 900 with battery charger 320 coupled thereto to charge rechargeable battery 204. As shown in FIG. 10, a first charging connection 1002 is coupled to battery voltage signal 910 to be coupled to first terminal 906 of rechargeable battery 204. A second charging connection 1004 is coupled to reference voltage signal 912 to be coupled to second terminal 904 of rechargeable battery 906 through safety circuit 902. A forward charge current may be provided by charger 320 over first charging connection 1002 to rechargeable battery 906, and a return charge current may be received by charger 320 from rechargeable battery 906 over second charging connection 1004. Safety circuit 902 may be configured with an under voltage lock out (UVLO) threshold value threshold value. When safety circuit 902 measures battery voltage signal 910 (e.g., a difference between battery voltage signal 910 and reference voltage signal 912) to have decreased below the UVLO threshold value, safety circuit is configured to transition electronic device 900 from a normal mode to a low current power-down mode. This is because, as described elsewhere herein, if rechargeable battery 204 discharges to a low voltage level, rechargeable battery 204 may be damaged. Thus, safety circuit 902 protects rechargeable battery 204 from reaching a voltage below this level.

Figure 8:
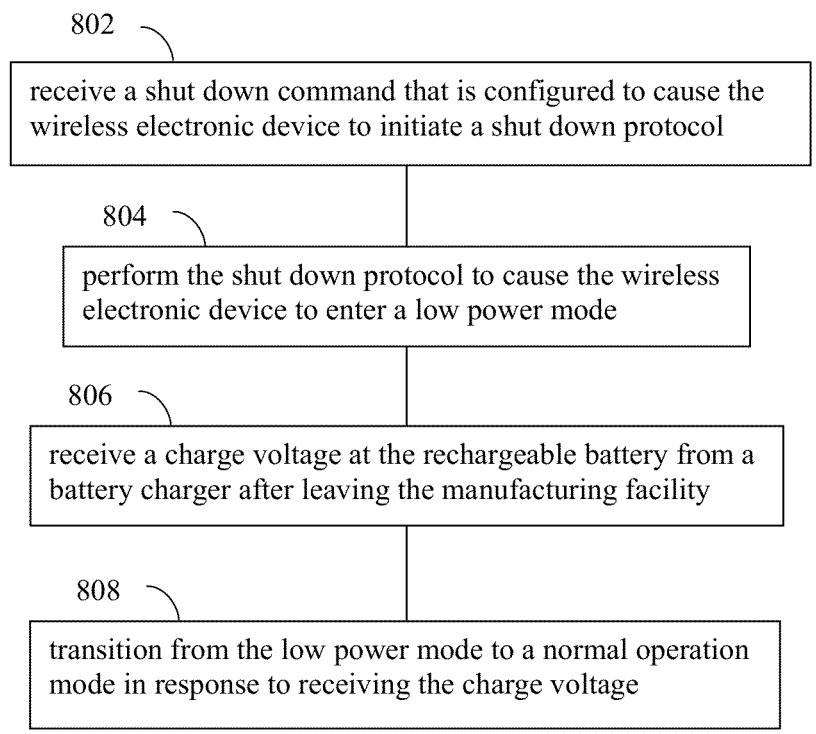
FIG. 8 shows a flowchart providing a process for shutting down an electronic device, according to an example embodiment.

In embodiments, electronic device 900 may be shut down by an external stimulus, in addition to being capable of being shut down by safety circuit 902. Such shut down transitions rechargeable battery 204 to a low power mode, as described further above (e.g., with respect to flowchart 800 of FIG. 8). In an embodiment, electronic device 900 may be configured to be selectively shut down (e.g., by receiving a shut down command) by leveraging the functionality of safety circuit 902. FIG. 11 shows a flowchart 1100 providing a process for transitioning electronic device 900 to a low power mode by using the functionality of safety circuit 902, according to an example embodiment. Flowchart 1100 is described as follows.

Flowchart 1100 begins with step 1102. In step 1102, an electronic device is received that includes a rechargeable battery and a battery safety circuit. For example, in an embodiment, the electronic device may be electronic device 900 of FIG. 9, which includes rechargeable battery 204 and safety circuit 902.

In step 1104, a voltage at a port of the battery safety circuit coupled to a battery voltage signal is forced to a voltage value that is less than a UVLO threshold value of the battery safety circuit to transition the electronic device from a normal mode to a low current power-down mode. For example, as described above, safety circuit 902 may be configured with a UVLO threshold value. When safety circuit 902 measures battery voltage signal 910 to have decreased below the UVLO threshold value, safety circuit 902 may be configured to transition electronic device 900 from a normal mode to a low current power-down mode. In such a situation, current discharge from rechargeable battery 204 is very low. In an embodiment, as shown in FIG. 9, electrical circuit 904 may generate shut down command 422 to have a value that when received by safety circuit 902, causes safety circuit 902 to cause rechargeable battery 204 to transition to operating in the low power mode. Electrical circuit 902 may generate shut down command 422 to have the shut down value in response to receiving a wireless shutdown command (e.g., in wireless command 416), or due to other stimulus. Such forcing may occur despite the actual voltage value of battery voltage signal 910 provided by rechargeable battery 204. For instance, battery voltage signal 910 provided by rechargeable battery 204 may be well above the UVLO threshold level. However, upon receipt of shut down command 422, safety circuit 902 may to cause electronic device 900 to transition to a low current power-down mode despite this.

Safety circuit 902 may be configured in various ways to protect rechargeable battery 204. For example, safety circuit 902 may include one or more electrical components that enable its functionality. FIG. 12 shows a circuit diagram of an electrical device 1200, according to an example embodiment. Electrical device 1200 is an example of electrical device 900 shown in FIG. 9. As shown in FIG. 12, electrical device 1200 includes rechargeable battery 204, a safety circuit 1230, and electrical circuit 904. Safety circuit 1230 includes a safety component 1202, a first transistor 1204, a second transistor 1206, a first resistor 1208, a second resistor 1210, and a capacitor 1212. Safety component 1202 has a first port 1214 coupled to battery voltage signal 910 through first resistor 1208, a second port 1216 coupled to reference voltage signal 912, a third port 1218 coupled to a first terminal of first transistor 1204, a fourth port 1220 coupled to a first terminal of second transistor 1206, and a fifth port 1222 coupled to a first terminal of second resistor 1210. First transistor 1204 and second transistor 1206 are coupled in series in reference voltage signal 912 between second terminal 908 of rechargeable battery 204 and second port 916 of electrical circuit 904. A second terminal of second resistor 1210 is coupled to reference voltage signal 912 between second transistor 1206 and second port 916 of electrical circuit 904. Capacitor 1212 is coupled between ports 1214 and 1216 of safety component 1202.

First resistor 1208 may be present for ESD (electrostatic discharge) protection and to filter power fluctuations (along with capacitor 1212). Second resistor 1210 may be present to protect against the reverse connection of a battery charger (e.g., charger 320 of FIG. 10) to electronic device 1200. First resistor 1208 may have any suitable value (e.g., 100-220 Ohms), second resistor 1210 may have any suitable value (e.g., 300 Ohms to 2 kOhms), and capacitor 1212 may have any suitable value (e.g., 0.1-1.0 µF).

In the example of FIG. 12, first and second transistors 1204 and 1206 are shown as field effect transistors (FETs) (e.g., N-channel enhancement mode metal oxide semiconductor FETs (MOSFETs)), but can be other types of transistors or switching devices in further embodiments. As shown in FIG. 12, third port 1218 of safety component 1202 is coupled to the gate terminal of first transistor 1204, and fourth port 1220 of safety component 1202 is coupled to the gate terminal of second transistor 1206. The drain terminals of first and second transistors 1204 and 1206 are shown coupled together, the source terminal of first transistor 1204 is coupled to second terminal 908 of rechargeable battery 204, and the source terminal of second transistor 1206 is coupled to second port 916 of electrical circuit 916.

Ports 1214, 1216, 1218, 1220, and 1222 may be pins, other connectors, or circuit nodes of safety component 1202. Safety component 1202 may include one or more electrical components that enable its functionality. For example, in an embodiment, safety component 1202 may be a commercially available safety IC such as a Seiko Instruments S-8211C Series battery protection IC, a RICOH R5426Nxxxx Series protection IC, or other commercially available battery protection component. In such an implementation, port 1214 may be a VDD pin, port 1216 may be a VSS pin, port 1218 may be a DO pin, port 1220 may be a CO pin, and port 1222 may be a VM pin. In the example of FIG. 12, safety component 1202 controls first and second transistors 1204 and 1206. First transistor 1204 may be referred to as a discharge control transistor and second transistor 1206 may be referred to as a charge control transistor. Safety component 1202 controls first transistor 1204 (using port 1218), causing first transistor 1204 to open (e.g., current is not able to flow between the source and drain terminals) if an overdischarge current or an overdischarge voltage event occurs. Safety component 1202 controls second transistor 1206 (using port 1220), causing second transistor 1206 to open if an overcharge current or an overcharge voltage event occurs. Safety component 1202 maintains first and second transistors 1204 and 1206 to both be closed (e.g., current can flow between the source and drain terminals) in normal operating circumstances.

Safety component 1202 includes power down protection. For instance, when the voltage of rechargeable battery 204 is below a voltage threshold, referred to as the battery UVLO threshold level, safety component 1202 shuts down. Safety component 1202 may be awakened from the shut down mode by applying a voltage on the charge connections of electronic device 1200, such as when charger 320 is coupled to electronic device 1200 as shown in FIG. 10.

In particular, in an embodiment (e.g., such as when safety component 1202 is Seiko S-8211C battery protection IC), when port 1214 (e.g., VDD) receives a voltage on battery voltage signal 910 that is less than the UVLO threshold level, indicating that rechargeable battery 204 has significantly discharged, safety component 1202 turns off (opens) first transistor 1204, sets an internal pull up between ports 1222 and 1214 (e.g., VM and VDD), and shuts down (e.g., electronic device 1200 enters a shut down mode). Safety component 1202 remains in power down mode as long as the voltage of port 1214 (VDD) minus the voltage of port 1222 (VM) is less than (<) the UVLO threshold level (e.g., 1.3V in the Seiko S-8211C battery protection IC). When a charger is coupled to rechargeable battery 204, the value of voltage of port 1214 (VDD) minus the voltage of port 1222 (VM) exceeds the UVLO voltage level (due to the applied charger voltage). In this condition, safety component 1202 turns on first transistor 1204, and electronic device 1200 transitions from the shut down to a normal operating mode.

Figures 13, 14:
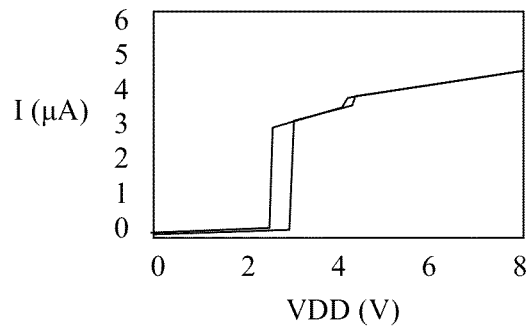
FIG. 13 shows a plot showing leakage current versus voltage for a safety component.
FIG. 14 shows a process for transitioning an electronic device to a normal operating mode from a low power mode, according to an example embodiment.

FIG. 13 shows a plot 1300 of leakage current versus voltage for safety component 1202 (e.g., for the Seiko S-8211C battery safety IC) to illustrate the benefit of the shut down mode. As shown in FIG. 13, current leakage is between 3 µA and 5 µA (e.g., for rechargeable battery 204 being a Li-Ion or Li-Po battery) for a voltage range of rechargeable battery 204 of 3.0V to 4.2V, while the current leakage is below 0.2 µA for a voltage below the UVLO threshold value for safety component 1202 (e.g., in the low power shut down mode). As such, much lower current leakage occurs from rechargeable battery 204 when safety component 1202 is in the shut down mode. Embodiments enable safety component 1202 to transition to the shut down mode due to conditions other than a low voltage of rechargeable battery 204, to enable electronic devices to be stored for much longer periods (e.g., 15 times longer) than conventionally possible. For example, safety component 1202 may be caused to transition to the shut down mode upon receiving a wireless command, as described above. Furthermore, embodiments enable safety component 1202 to transition from the shut down mode to a normal operating mode based on various events/conditions other than a charge voltage applied to rechargeable battery 204. Furthermore, such embodiments provide these capabilities without adversely impacting the battery protection provided by the battery safety circuit.

In embodiments, techniques are provided that emulate shut down and shut down release conditions. For example, in an embodiment, as in step 1104 described above (flowchart 1100 of FIG. 11), a voltage at port 1214 (e.g., VDD) of safety component 1202 may be forced to a voltage value that is less than the UVLO threshold value of a safety component to transition an electronic device from a normal mode to a low current power-down mode, despite the voltage of rechargeable battery 204. Furthermore, in an embodiment, as in a step 1402 shown in FIG. 14 (which may be an optional additional step of flowchart 1100), the voltage at port 1214 may be forced to a voltage value that is greater than the UVLO threshold value of the safety component to transition the electronic device from the low current power down mode to the normal operating mode. For example, in an embodiment, a discharge control transistor may be temporarily bypassed to enable the voltage of rechargeable battery 204 (if sufficiently high) to enable the safety component, and to transition the electronic device from the low current power down mode to the normal operating mode.

The following subsections describe further example embodiments for power down modes/shut down modes and wake up modes/shut down release modes for electronic devices.

A. Example Power Down Mode Embodiments

Figure 15:
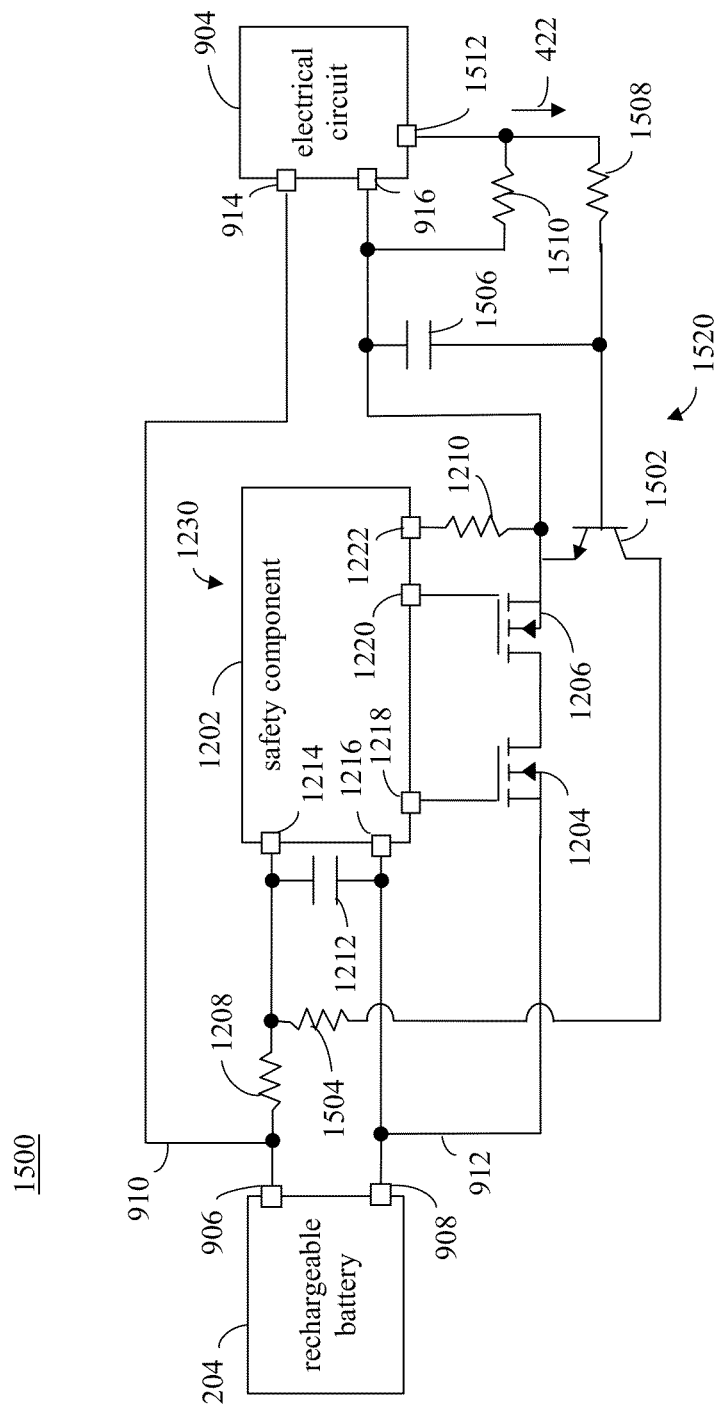
FIG. 15 shows a circuit diagram of an electronic device that includes a power down mode circuit, according to an example embodiment.

Electronic devices, such as electronic device 1200 shown in FIG. 1200 and further electronic devices described herein, may be configured in various ways to be transitioned to a low power mode. For instance, FIG. 15 shows a circuit diagram of an electronic device 1500 that includes a power down mode circuit 1520, according to an example embodiment. Electronic device 1500 is similar to electronic device 1200 of FIG. 12, with the addition of power down mode circuit 1520. Power down mode circuit 1520 is configured to enable electronic device 1200 to be transitioned a low power mode (e.g., according to step 1104 of flowchart 1100 in FIG. 11).

Figure 16:
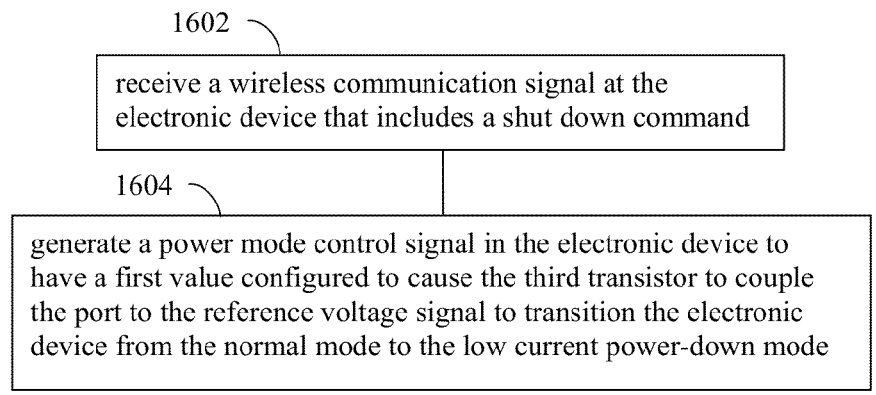
FIG. 16 shows a flowchart that provides a process for transitioning the electronic device of FIG. 15 to a low power mode, according to an example embodiment.

As shown in FIG. 15, power down mode circuit 1520 includes a third transistor 1502. Third transistor 1502 has a first terminal that receives power mode control signal 422, a second terminal coupled to reference voltage signal 912 between second transistor 1206 and second port 916 of electrical circuit 904, and a third terminal coupled to first port 1214 of safety component 1202. FIG. 16 shows a flowchart 1600 that provides a process for transitioning electronic device 1500 to a low power mode using third transistor 1502, according to an example embodiment. Flowchart 1600 is described as follows.

Flowchart 1600 begins with step 1602. In step 1602, a wireless communication signal is received at the electronic device that includes a shut down command. For instance, as described further above, a shut down command 422 may be received in a wireless command 416, as shown in FIG. 4. Electrical circuit 904 of FIG. 15 may include a receiver (e.g., transceiver 408 of FIG. 4) that receives wireless command 416. Note that in an alternative embodiment, shut down command 422 may be generated in response to a button press (e.g., by a user of electronic device 1500) or in other manner.

In step 1604, a power mode control signal is generated in the electronic device to have a first value configured to cause the third transistor to couple the port to the reference voltage signal to transition the electronic device from the normal mode to the low current power-down mode. For example, electrical circuit 904 of FIG. 15 may include a shut down module 414 (FIG. 4) that generates shut down command 422 based on a received wireless command 416. As shown in FIG. 15, electrical circuit 904 may output shut down command 422 from a third port 1512 (e.g., a general I/O port, or other port), which is received by third transistor 1502. Shut down command 422 controls third transistor 1502 to selectively cause safety component 1202 to shut down to transition electronic device 1500 to a low power mode. For example, if shut down command 422 has a low value (e.g., a "0" value), third transistor 1502 is open, and electronic device 1500 operates in a normal operating mode. If shut down command 422 transitions to a high value (e.g., a "1" value), third transistor 1502 is closed, coupling first port 1214 of safety component 1202 to reference voltage signal 912. As such, a voltage at port 1214 of safety component 1202 is forced to a voltage value that is less than the UVLO threshold value, which transitions electronic device 1500 from the normal mode to the low current power-down mode, despite the voltage of rechargeable battery 204.

In an embodiment, as shown in FIG. 15, power down mode circuit 1520 may further include a third resistor 1504, a capacitor 1506, and a fourth resistor 1508. Furthermore, third transistor 1502 is shown as a bipolar (junction) transistor (BJT) (e.g., an NPN BJT), but can be another type of transistor or switching device in further embodiments. The third terminal (e.g., collector) of third transistor 1502 is coupled to first port 1214 of safety component 1202 through third resistor 1504. The first terminal (e.g., base) of third transistor 1502 receives shut down command 422 through fourth resistor 1508. The second terminal (e.g., emitter) of third transistor 1502 is coupled to reference voltage signal 912 between second transistor 1206 and second port 916 of electrical circuit 904. Capacitor 1506 has a first terminal coupled to the first terminal of third transistor 1502 and a second terminal coupled to reference voltage signal 912 between second transistor 1206 and second port 916 of electrical circuit 904.

A resistor 1510 may be present in power down mode circuit 1520 that is coupled between ports 916 and 1512 of electrical circuit 904. When present, resistor 1510 is a pull down resistor, and may have any suitable value (e.g., 40 kOhms). Fourth resistor 1508 may have any suitable value (e.g., 10 kOhms). Capacitor 1506 may have any suitable value.

In such an implementation, when shut down command 422 closes third transistor 1502, a signal path through third transistor 1502 is enabled, causing a voltage divider (formed by resistors 1208 and 1504) to be on. Thus, port 1214 receives a value of battery voltage signal 910 divided by the voltage divider. For example, if resistor 1208 has a value of 220 Ohms and resistor 1504 has a value of 330 Ohms, the voltage at port 1214 has a value of approximately 60% of battery voltage signal 910. If battery voltage signal 910 is 4.2V, for example, the voltage at first port 1214 is approximately 2.5V. If 2.5V voltage is less than the UVLO threshold value of safety component 1202, safety component 1202 shuts down, transitioning electronic device 1500 to low power mode. In such case, electrical circuit 904, which is normally powered by rechargeable battery 204, loses power (because first transistor 1204 opens). As such, shut down command 422 is stopped, disabling the voltage divider.

Figure 17:
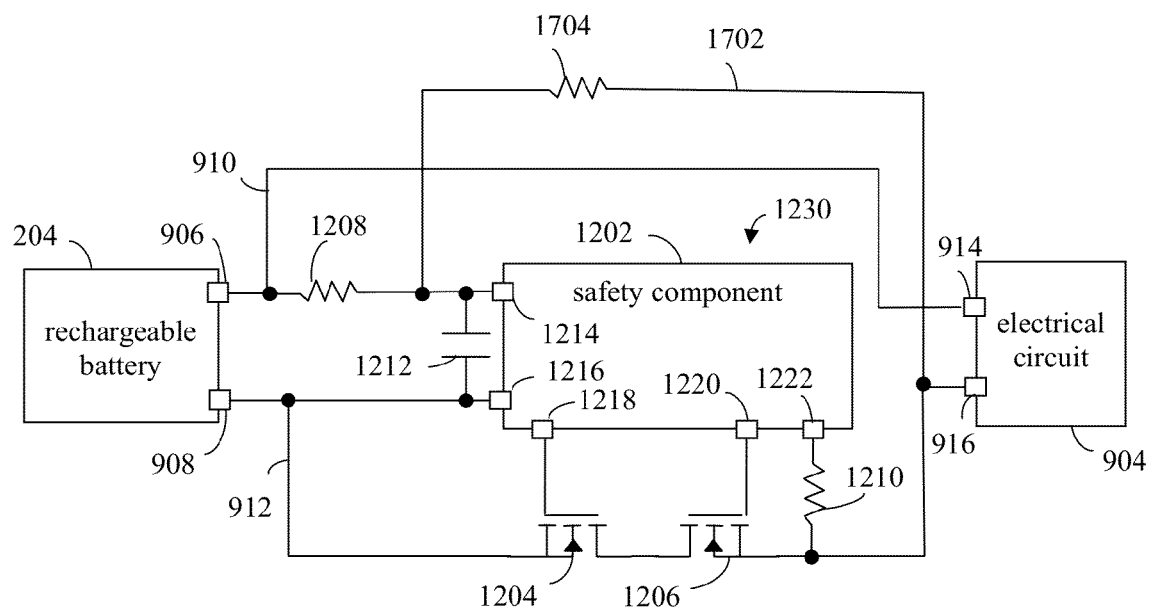
FIG. 17 shows a circuit diagram of an electronic device, according to an example embodiment.

In another embodiment, a manual connection may be made to perform step 1104 of flowchart 1100 (FIG. 11), to force safety component 1202 into a low current power down mode. For instance, FIG. 17 shows a circuit diagram of an electronic device 1700, according to an example embodiment. Electronic device 1700 is similar to electronic device 1200 of FIG. 12, with the addition of a resistor 1704 coupled between first port 1214 of safety component 1202 and reference voltage signal 912 (at second port 916 of electrical circuit 916) by a connection 1702. When present, resistor 1704 may have any suitable value (e.g., 330 Ohms).

Resistor 1704 and connection 1702 may be coupled as shown in FIG. 17 by a user to manually force safety component 1202 into a low current power down mode. For instance, resistor 1704 and connection 1702 may be applied temporarily, as long as need to cause safety component 1202 to transition to the low current power down mode. An advantage of the implementation of FIG. 17 relative to FIG. 15 is that power down mode circuit 1520 (e.g., third transistor 1502, etc.) is not required to be present. However, there are disadvantages to the implementation of FIG. 17 relative to FIG. 15. For instance, a casing of electronic device 1700 (e.g., a headset case, a mobile device case, etc.) needs to be opened to apply resistor 1704 and connection 1702, and an easy way does not exist to verify that electronic device 1700 was closed properly without damaging functionality of electronic device 1700 (because the power is shut down). Otherwise, connection points for connection 1702 need to be accessible from the exterior of the casing of electronic device 1700, which may lead to increased manufacturing cost and issues with safety.

B. Example Wake Up Mode Embodiments

Electronic devices, such as electronic device 1200 shown in FIG. 1200 and further electronic devices described herein, may be configured in various ways to be transitioned from the low power mode to a normal operating mode. For instance, with regard to the embodiment of FIG. 12 described above, a step 1802 shown in FIG. 18 may be performed. In step 1802, at least the first transistor in the reference voltage signal is bypassed to transition the electronic device from the low current power down mode to the normal operating mode. For instance, referring to FIG. 12, by bypassing first transistor 1204 (which is open in low power mode), second terminal 908 of rechargeable battery 204 may be coupled to second port 916 of electrical circuit 916, to provide power to safety component 1202 and to electrical circuit 904 (first terminal 906 of rechargeable battery 204 is already coupled to first port 914 of electrical circuit 904 and to first port 1214 of safety component 1202). In such case, the UVLO threshold value of safety component 1202 of exceeded, causing safety component 1202 to transition from shut down mode to a normal operating mode, and to turn on first transistor 1204 so that first transistor 1204 couples second terminal 908 of rechargeable battery 204 to second port 916 of electrical circuit 916. The bypass may subsequently be removed.

Figure 20:
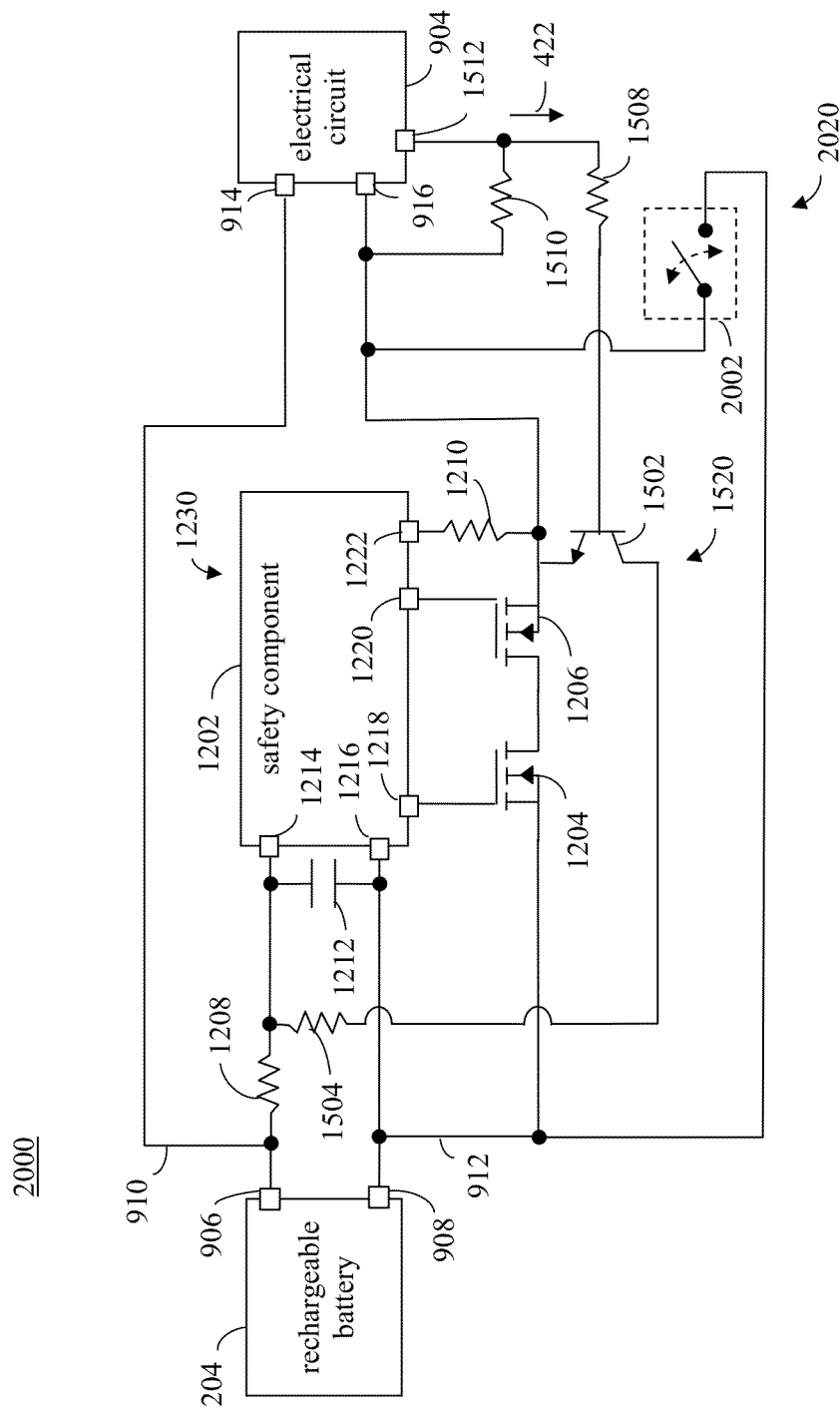
FIGS. 20-22 show example circuit diagrams where a switch is used to bypass a transistor to transition electronic devices to normal operating modes, according to embodiments.
Figure 21:
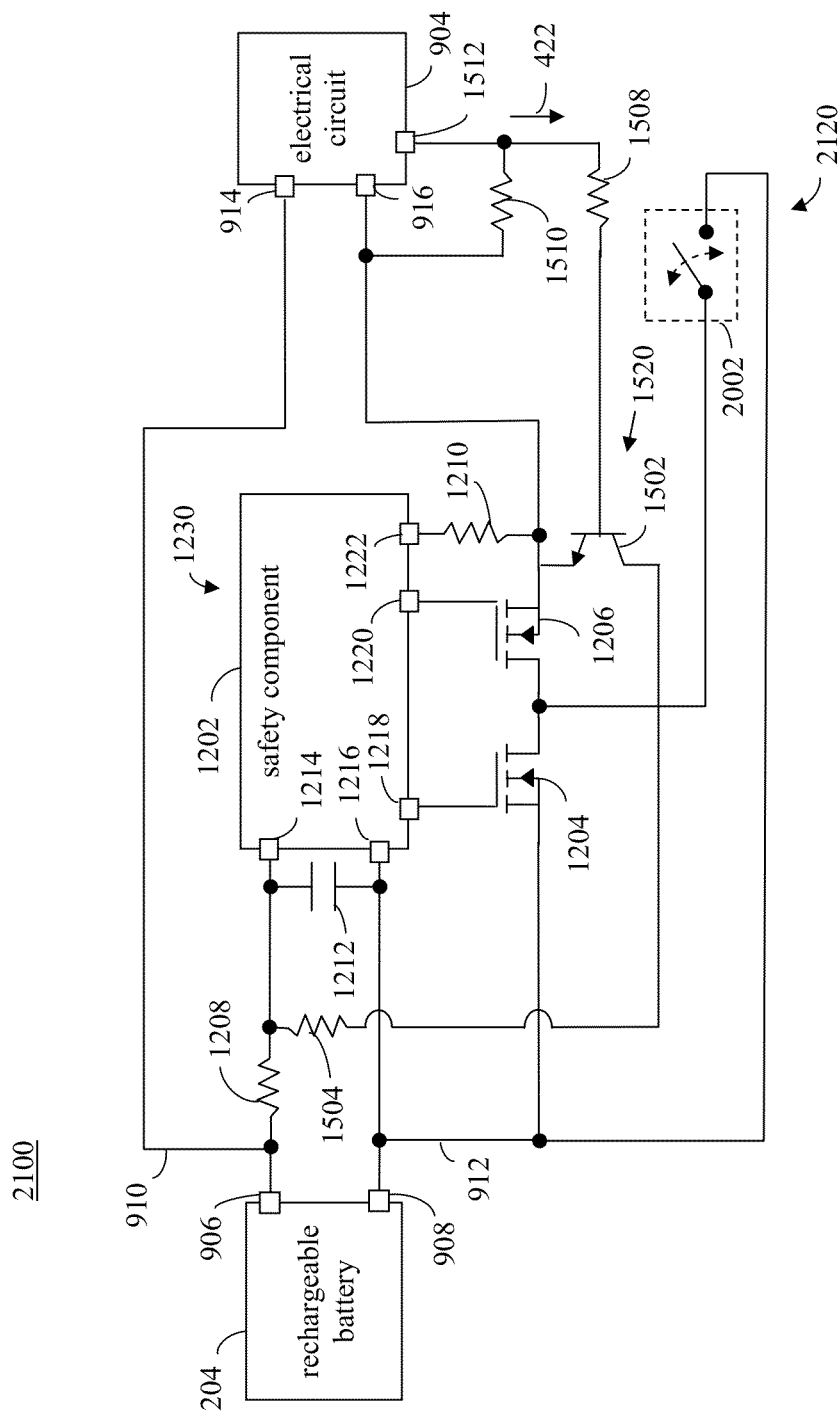
Figure 22:
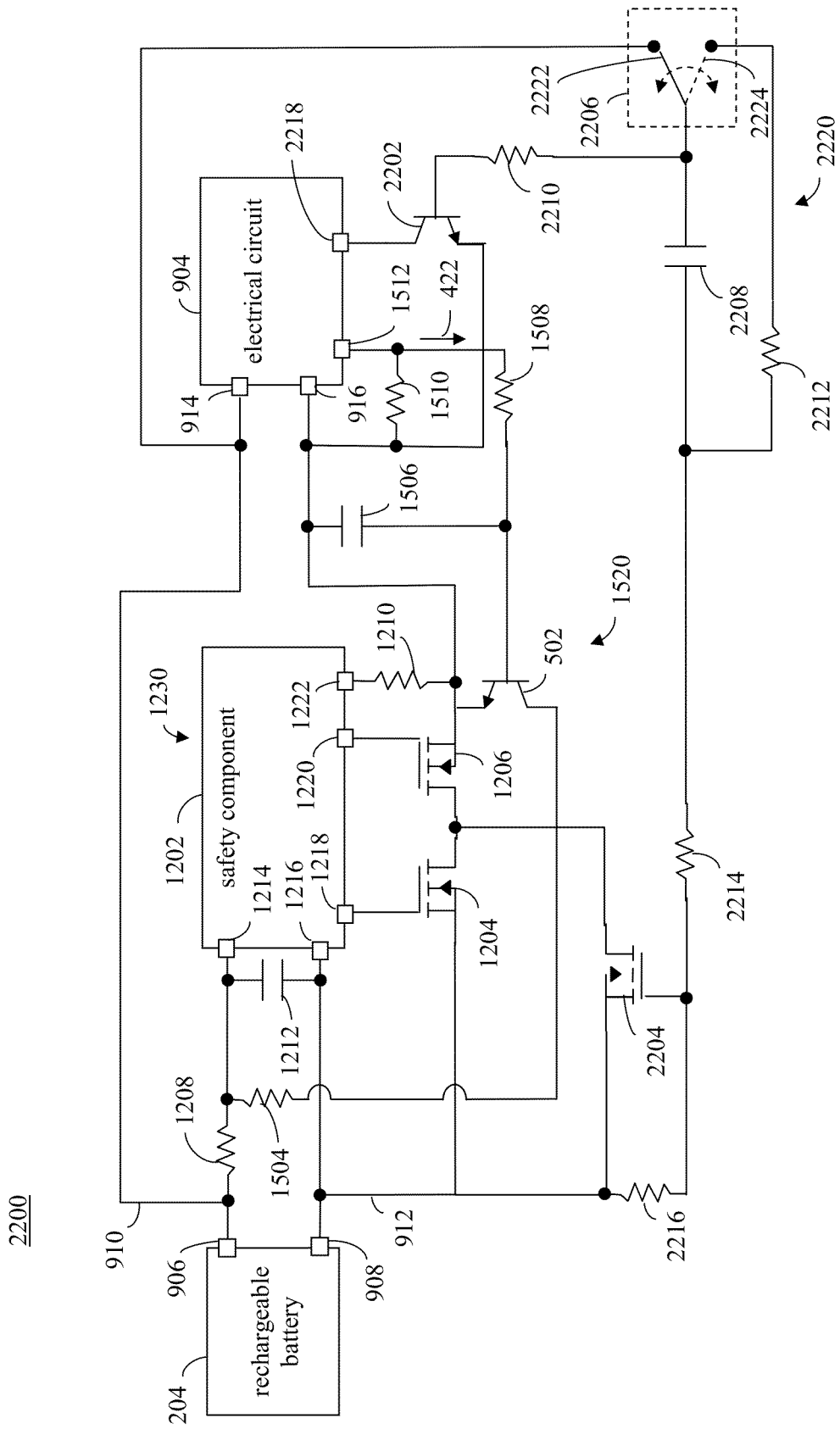

For instance, in an embodiment, step 1802 of FIG. 18 may include a step 1902 shown in FIG. 19. In step 1902, a switch may be temporarily closed to bypass the first transistor in the reference voltage signal to transition the electronic device from the low current power down mode to the normal operating mode. For instance, FIGS. 20-22 show example circuit diagrams where a switch is used to bypass first transistor 1204 to transition electronic devices to normal operating modes, according to embodiments. FIGS. 20-22 are described as follows.

FIG. 20 shows a circuit diagram of an electronic device 2000 that includes power down mode circuit 1520 and a wake up mode circuit 2020, according to an example embodiment. Electronic device 2000 is similar to electronic device 1500 of FIG. 15, with the addition of wake up mode circuit 2020. Wake up mode circuit 2020 is configured to enable electronic device 2000 to transition from a low power mode to a normal operating mode (e.g., according to step 1902 of FIG. 19). As shown in FIG. 20, wake up mode circuit 2020 includes a switch 2002. Switch 2002 has a first terminal coupled to reference voltage signal 912 between second transistor 1206 and second port 916 of electrical circuit 904, and a second terminal coupled to second terminal 908 of rechargeable battery 204. In this manner, switch 2002 provides a selectively enabled bypass path for reference voltage signal 912 around first transistor 1204 (and second transistor 1206).

For example, if switch 2002 is opened, switch 2002 does not provide a bypass path for reference voltage signal 912 around first transistor 1204, and safety component 1202 may open first transistor 1204 to maintain electronic device 2000 in a low power mode (e.g., according to step 1104 in FIG. 11). If switch 2002 is closed, switch 2002 provides a bypass path for reference voltage signal 912 around first transistor 1204. As such, even if first transistor 1204 is open, the UVLO threshold value of safety component 1202 may be exceeded by a voltage of rechargeable battery 204, causing safety component 1202 to transition from shut down mode to a normal operating mode. First transistor 1204 may then be turned on by safety component 1202 so that first transistor 1204 couples second terminal 908 of rechargeable battery 204 to second port 916 of electrical circuit 916. Switch 2002 may then be closed (and electronic device 2000 is maintained in the normal operating mode).

Switch 2002 is shown in FIG. 20 as a single pull, single throw (SPST) switch. In an embodiment, switch 2002 may be a button that is pressed by a user. For instance, switch 2002 may be mounted on a casing of electronic device 2000. In an embodiment, switch 2002 may be an on-off switch of electronic device 2000. In an alternative embodiment, switch 2002 may be operated by a command (e.g., received in a wireless communication signal).

FIG. 21 shows a circuit diagram of an electronic device 2100 that includes power down mode circuit 1520 and a wake up mode circuit 2120, according to another example embodiment. Electronic device 2100 is similar to electronic device 1500 of FIG. 15, with the addition of wake up mode circuit 2120. Wake up mode circuit 2120 is configured to enable electronic device 2100 to transition from a low power mode to a normal operating mode (e.g., according to step 1902 of FIG. 19). As shown in FIG. 21, wake up mode circuit 2120 includes switch 2002. In FIG. 21, switch 2002 has a first terminal coupled to reference voltage signal 912 between first transistor 1204 and second transistor 1206, and a second terminal coupled to second terminal 908 of rechargeable battery 204. In this manner, switch 2002 provides a selectively enabled bypass path for reference voltage signal 912 around first transistor 1204 (but not around second transistor 1206). Switch 2002 may be operated in a similar manner as described above with respect to FIG. 20 to selectively enable the bypass path of FIG. 21 for electronic device 2100, to cause electronic device 2100 to transition from low power mode to a normal operating mode.

FIG. 22 shows a circuit diagram of an electronic device 2200 that includes power down mode circuit 1520 and a wake up mode circuit 2220, according to an example embodiment. Electronic device 2200 is similar to electronic device 1500 of FIG. 15, with the addition of wake up mode circuit 2220. Wake up mode circuit 2220 is configured to enable electronic device 2200 to transition from a low power mode to a normal operating mode (e.g., according to step 1902 of FIG. 19). As shown in FIG. 20, wake up mode circuit 2020 includes a fourth transistor 2202, a fifth transistor 2204, a switch 2206, a second capacitor 2208, a fifth resistor 2210, a sixth resistor 2212, a seventh resistor 2214, and an eighth resistor 2216.

Fourth transistor 2202 has a first terminal coupled to a first terminal of fifth resistor 2210, a second terminal coupled to a wake up signal output at a fourth port 2218 of electrical circuit 904, and a third terminal coupled to reference voltage signal 912 between second transistor 1206 and electrical circuit 904. Fifth resistor 2210 has a second terminal coupled to a first terminal of switch 2206. Switch 2206 has a second terminal coupled to battery voltage signal 910, and a third terminal coupled to a first terminal of sixth resistor 2212. Second capacitor 2208 has a first terminal coupled to the first terminal of switch 2206, and a second terminal coupled to a second terminal of sixth resistor 2212 and a first terminal of seventh resistor 2214. Fifth transistor 2204 has a first terminal coupled to a second terminal of seventh resistor 2214 and a first terminal of eighth resistor 2216, a second terminal coupled to reference voltage signal 912 between first transistor 1204 and second transistor 1206, and a third terminal coupled to a second terminal of eighth resistor 2216 and second terminal 908 of rechargeable battery 204. Switch 2206 is shown in FIG. 22 as a single pull, double throw switch. Switch 2206 is operable (in a first position 2222) to couple together the first and second terminals of switch 2206 to enable wake up mode circuit 2220 to force battery voltage signal 910 to a voltage value that is greater than the UVLO threshold value of safety component 1202, and (in a second position 2224) to return to coupling together the first and third terminals of switch 2206. For example, when switch 2206 is moved to first position 2222, capacitor 2208 is not charged (and starts charging), and battery voltage signal 910 is coupled to the first terminal of fifth transistor 2204. As a result, fifth transistor 2204 turns on (conducts current), to cause first transistor 1204 to be bypassed, exposing ports 1214 and 1222 (VDD-VM) of safety component 1202 to a voltage difference that is greater than the UVLO threshold, which wakes up safety component 1202 as described above. When capacitor 2208 becomes charged, battery voltage signal 910 is no longer received at fifth transistor 2204. Thus fifth transistor 2204 turns off (no longer conducts current), and first transistor 1204 is no longer bypassed. When switch 2206 is switched to second position 2224, switch 2206 provides capacitor 2208 with a discharge path through sixth resistor 2212.

Fifth transistor 2204 may be present to prevent potentially damaging current leakage from safety component 1202 when switch 2206 is moved to the first position 2222 at a time when the charge on rechargeable battery 204 is very low. The embodiment of FIG. 22 (as well as the embodiments of FIGS. 20 and 21) may be used throughout the life of electronic device 2200 (e.g., each time the user turns electronic device 2200 on or off).

Fifth transistor 2204 is shown as a FET (e.g., N-channel enhancement mode MOSFET), but can be other types of transistors or switching devices in further embodiments. In an embodiment, switch 2206 may be a button that is pressed by a user, a "slide"-type switch, or other type of switch. For instance, switch 2206 may be mounted on a casing of electronic device 2200. In an embodiment, switch 2206 may be an on-off switch of electronic device 2200. Switch 2206 may be configured such that switch 2206 may be moved to first position 2222 to switch electronic device 2200 "on", and may be moved to second position 2224 to switch electronic device 2200 "off.

Fourth transistor 2202 is shown as a BJT (e.g., an NPN BJT), but can be another type of transistor or switching device in further embodiments. Note that fourth transistor 2202, resistor 2210, and fourth port 2218 are optionally present. Fourth transistor 2202, resistor 2210, and fourth port 2218 are configured to provide an indication to electronic device 2200 (at port 2218) of the particular position of switch 2206. Second capacitor 2208 and sixth resistor 2212 may have any suitable values (e.g., 0.22 µC and 10 Ohms, respectively). Eighth resistor 2216 may have any suitable value (e.g., 3 MOhms) Resistor 2214 is optional.

Note that the electrical connections shown in the figures described above (to couple together circuit components) may be wires, circuit board traces, cables, and/or other forms of electrical connections, as would be known to persons skilled in the relevant art(s).

V. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents

What is claimed is:

1. A method, comprising:
receiving an electronic device that includes a rechargeable battery and a battery safety circuit, wherein a first terminal of the rechargeable battery and a port of the battery safety circuit are coupled at a battery voltage signal from the rechargeable battery, and a second terminal of the rechargeable battery is coupled to a reference voltage signal; and forcing a voltage at the port of the battery safety circuit to a voltage value relative to a threshold value of the battery safety circuit to transition the electronic device from a normal mode to a low current power-down mode.

2. The method of claim 1, further comprising:
coupling a charge voltage across the first and second terminals of the rechargeable battery to cause the electronic device to transition to the normal mode.

3. The method of claim 1, further comprising:
receiving a wireless communication signal at the electronic device that includes a shut down command; and wherein said forcing comprises:
generating a power mode control signal in the electronic device to have a first value configured to force the voltage at the port of the battery safety circuit to the voltage value that is less than a UVLO threshold value upon receiving the shut down command.

4. The method of claim 1, wherein the battery safety circuit includes a first transistor, a second transistor, and a safety component that has a first port coupled to the battery voltage signal, a second port coupled to the reference voltage signal, a third port coupled to a first terminal of the first transistor, a fourth port coupled to a first terminal of the second transistor, and a fifth port coupled to the reference voltage signal between the second transistor and the electrical circuit, wherein the first transistor and second transistor are coupled in series in the reference voltage signal between the second terminal of the rechargeable battery and the electrical circuit.

5. The method of claim 4, wherein the electronic device includes a third transistor that has a first terminal that receives the power mode control signal, a second terminal coupled to the reference voltage signal between the second transistor and the electrical circuit, and a third terminal coupled to the battery voltage signal, wherein said forcing comprises:
generating a power mode control signal in the electronic device to have a first value configured to cause the third transistor to couple the port to the reference voltage signal to transition the electronic device from the normal mode to the low current power-down mode.

6. The method of claim 1, further comprising:
forcing the voltage at the port of the battery safety circuit to a second voltage value that is greater than a UVLO threshold value of the battery safety circuit to transition the electronic device from the low current power down mode to the normal operating mode.

7. The method of claim 4, further comprising:
bypassing at least the first transistor in the reference voltage signal to transition the electronic device from the low current power down mode to the normal operating mode.

8. The method of claim 7, wherein the electronic device includes a switch configured to bypass the first transistor in the reference voltage signal, wherein said bypassing comprises:
temporarily closing the switch to bypass the first transistor in the reference voltage signal to transition the electronic device from the low current power down mode to the normal operating mode.

9. An electronic device, comprising:
a battery safety circuit that has a first port coupled to a battery voltage signal at a first terminal of a rechargeable battery of the electronic device and a second port coupled to a reference voltage signal at a second terminal of the rechargeable battery; and
a power down mode circuit configured to receive a power mode control signal;
wherein if the power mode control signal has a first value, the power down mode circuit is configured to force a voltage at the first port to a voltage value relative to a threshold value of the battery safety circuit to transition the electronic device from a normal operating mode to a low current power down mode.

10. The electronic device of claim 9, wherein the battery safety circuit is configured to cause the electronic device to transition from the low current power down mode to the normal operating mode if a charge voltage is coupled across the first and second terminals of the rechargeable battery.

11. The electronic device of claim 9, further comprising:
an electrical circuit configured to generate the power mode control signal,
wherein the electrical circuit includes a receiver, wherein the electrical circuit is configured to generate the power mode control signal to have the first value if a shut down command is received by the receiver in a wireless communication signal.

12. The electronic device of claim 9, wherein the electrical circuit comprises:
an integrated circuit having a first port coupled to the battery voltage signal, a second port coupled to the reference voltage signal, and a third port that outputs the power mode control signal.

13. The electronic device of claim 9, wherein the battery safety circuit comprises:
a first resistor;
a second resistor;
a first transistor;
a second transistor; and
a safety component that includes the first port, the second port, a third port, a fourth port, and a fifth port, wherein the first port is coupled to the battery voltage signal through the first resistor, the second port is coupled to the reference voltage signal, the third port is coupled to a first terminal of the first transistor, the fourth port is coupled to a first terminal of the second transistor, and the fifth port is coupled to a first terminal of the second resistor;
wherein the first transistor and second transistor are coupled in series in the reference voltage signal between the second terminal of the rechargeable battery and the electrical circuit; and
wherein a second terminal of the second resistor is coupled to the reference voltage signal between the second transistor and the electrical circuit.

14. The electronic device of claim 13, wherein the power down mode circuit comprises:
a third transistor that has a first terminal that receives the power mode control signal, a second terminal coupled to the reference voltage signal between the second transistor and the electrical circuit, and a third terminal coupled to the first port of the safety component.

15. The electronic device of claim 14, wherein the power down mode circuit further comprises:
a third resistor;
a fourth resistor; and
a capacitor;
wherein the third terminal of the third transistor is coupled to the first port of the safety component through the third resistor;

wherein the first terminal of the third transistor is configured to receive the power mode control signal through the fourth resistor;
wherein the second terminal of the third transistor is coupled to the reference voltage signal between the second transistor and the electrical circuit; and
wherein the capacitor has a first terminal coupled to the first terminal of the third transistor and a second terminal coupled to the reference voltage signal between the second transistor and the electrical circuit.

16. The electronic device of claim 15, wherein the threshold value of the battery safety circuit is an under voltage lock out (UVLO) threshold value; and
further comprising:
a wake up mode circuit configured to force the first port to a voltage value that is greater than the UVLO threshold value of the battery safety circuit to transition the electronic device from the low current power down mode to the normal operating mode.

17. The electronic device of claim 16, wherein the wake up mode circuit includes a switch having a first terminal coupled to the reference voltage signal between the second transistor and the electrical circuit, and a second terminal coupled to the second terminal of the rechargeable battery.

18. The electronic device of claim 16, wherein the wake up mode circuit includes a switch having a first terminal coupled to the reference voltage signal between the first transistor and the second transistor, and a second terminal coupled to the second terminal of the rechargeable battery.

19. The electronic device of claim 16, wherein the wake up mode circuit comprises:
a fourth transistor;
a fifth transistor;
a switch;
a second capacitor;
a fifth resistor;
a sixth resistor; and
a seventh resistor;
wherein the fourth transistor has a first terminal coupled to a first terminal of the fifth resistor, a second terminal coupled to a wake up signal generated by the electrical circuit, and a third terminal coupled to the reference voltage signal between the second transistor and the electrical circuit;
wherein the fifth resistor has a second terminal coupled to a first terminal of the switch;
wherein the switch has a second terminal coupled to the battery voltage signal, and a third terminal coupled to a first terminal of the sixth resistor;
wherein the second capacitor has a first terminal coupled to the first terminal of the switch, and a second terminal coupled to a second terminal of the sixth resistor and a first terminal of the seventh resistor;
wherein the fifth transistor has a first terminal coupled to a second terminal of the seventh resistor, a second terminal coupled to the reference voltage signal between the first transistor and the second transistor, and a third terminal coupled to the second terminal of the rechargeable battery; and
wherein the switch is operable to temporarily couple together the first and second terminals of the switch to enable the wake up mode circuit to force the battery voltage signal to a voltage value that is greater than the UVLO threshold value of the battery safety circuit, and to return to coupling together the first and third terminals of the switch.

20. An electronic device, comprising:
a battery safety circuit that has a first port coupled to a battery voltage signal of a rechargeable battery and a second port coupled to a reference voltage signal of the rechargeable battery; and
a receiver configured to wirelessly receive a shut down command;
wherein, in response to the received shut down command, a voltage at the first port is configured to be forced to a voltage value that is less than an under voltage lock out (UVLO) threshold value of the battery safety circuit to transition the electronic device from a normal operating mode to a low current power down mode.

21. The electronic device of claim 20, wherein the battery safety circuit is configured to cause the electronic device to transition from the low current power down mode to the normal operating mode if a charge voltage is coupled across the battery voltage signal and the reference voltage signal.

22. The electronic device of claim 21, further comprising:
a wake up mode circuit configured to force the first port to a voltage value that is greater than the UVLO threshold value of the battery safety circuit to transition the electronic device from the low current power down mode to the normal operating mode.

23. The electronic device of claim 20, further comprising:
an electrical circuit configured to generate a power mode control signal to have a first value when the shut down command is received by the receiver in a wireless communication signal; and
a power down mode circuit configured to receive the power mode control signal;
wherein if the power mode control signal has a first value, the power down mode circuit is configured to force the voltage at the first port to the voltage value that is less than the UVLO threshold value of the battery safety circuit to transition the electronic device from the normal operating mode to the low current power down mode.

24. The electronic device of claim 20, further comprising:
a transistor configured to be turned off to transition the electronic device from the normal operating mode to the low current power down mode.

25. The electronic device of claim 24, wherein the transistor is a metal oxide semiconductor field effect transistor (MOSFET).

26. A method in an electronic device, comprising:
wirelessly receiving a shut down command; and
in response to the received shut down command, forcing a voltage at a first port of a battery safety circuit of the electronic device that is coupled to a battery voltage signal of a rechargeable battery of the electronic device to a voltage value that is less than an under voltage lock out (UVLO) threshold value of the battery safety circuit to transition the electronic device from a normal operating mode to a low current power down mode, the battery safety circuit having a second port coupled to a reference voltage signal of the rechargeable battery.

27. The method of claim 26, further comprising:
receiving a charge voltage across the battery voltage signal and the reference voltage signal; and
transitioning the electronic device from the low current power down mode to the normal operating mode in response to receiving the charge voltage.

28. The method of claim 27, wherein said transitioning comprises:
forcing the first port to a voltage value that is greater than the UVLO threshold value of the battery safety circuit to transition the electronic device from the low current power down mode to the normal operating mode.

29. The method of claim 26, wherein said forcing comprises:

generating a power mode control signal to have a first value when the shut down command is received; and forcing the voltage at the first port to the voltage value that is less than the UVLO threshold value of the battery safety circuit to transition the electronic device from the normal operating mode to the low current power down mode in response to the power mode control signal having the first value.

30. The method of claim 26, further comprising:

turning off a transistor to transition the electronic device from the normal operating mode to the low current power down mode.

* * * * *